(12) United States Patent
Schroer et al.

(10) Patent No.: US 12,520,815 B2
(45) Date of Patent: Jan. 13, 2026

(54) ANIMAL ENCLOSURE CONFIGURED FOR USE WITH A VENTILATION SYSTEM

(71) Applicant: Midmark Corporation, Versailles, OH (US)

(72) Inventors: Joseph A. Schroer, Leawood, KS (US); Michael L. Matteson, Kansas City, KS (US)

(73) Assignee: Midmark Corporation, Versailles, OH (US)

( * ) Notice: Subject to any disclaimer, the term of this patent is extended or adjusted under 35 U.S.C. 154(b) by 672 days.

(21) Appl. No.: 16/676,536

(22) Filed: Nov. 7, 2019

(65) Prior Publication Data

US 2020/0137977 A1 May 7, 2020

Related U.S. Application Data

(60) Provisional application No. 62/756,813, filed on Nov. 7, 2018.

(51) Int. Cl.
*A01K 1/00* (2006.01)
*A01K 1/03* (2006.01)
(Continued)

(52) U.S. Cl.
CPC .............. *A01K 1/0064* (2013.01); *A01K 1/03* (2013.01); *A01K 1/033* (2013.01); *F24F 7/06* (2013.01);
(Continued)

(58) Field of Classification Search
CPC ........ F24F 7/06; F24F 2007/001; F24F 13/10; A01K 1/0064; A01K 1/033; A01K 1/03
See application file for complete search history.

(56) References Cited

U.S. PATENT DOCUMENTS 2,936,692 A * 5/1960 White ..................... F24F 13/12
454/260
3,919,978 A * 11/1975 Schaefer ................ A01K 1/031
119/500
(Continued)

FOREIGN PATENT DOCUMENTS

CA 2049929 A1 * 9/1990
FR 2741425 A1 * 5/1997 ........... A01K 1/0047
(Continued)

OTHER PUBLICATIONS

Translation, FR-2741425-A1 (Year: 1997).*
Translation KR-20140014876-A (Year: 2014).*
Mason Company—Raintree™ Cat Condo (posted on the Internet prior to Nov. 7, 2018 at masonco.com/pdfs/resources/catalog/raintree-cat-condo.pdf).
(Continued)

*Primary Examiner* — Jessica Yuen
(74) *Attorney, Agent, or Firm* — Frost Brown Todd LLP

(57) ABSTRACT

An animal enclosure with a wall assembly and a panel that is configured to couple to the wall assembly. The wall assembly includes a plurality of walls that are coupled together to define an interior space. The walls define an opening configured for fluid connection to a ventilation system. When the panel is coupled to the wall assembly, the panel divides the interior space into a vent space, which is in fluid communication with the opening, and a living space. A vent opening formed in the panel is configured to place the living space in fluid communication with the vent space. The panel may be removably coupled to the wall assembly. The panel may include a damper system for selectively opening and closing the vent opening.

36 Claims, 19 Drawing Sheets

(51) Int. Cl.
*F24F 7/00* (2021.01)
*F24F 7/06* (2006.01)
*F24F 13/10* (2006.01)

(52) U.S. Cl.
CPC ........ *F24F 13/10* (2013.01); *F24F 2007/001* (2013.01)

(56) References Cited

U.S. PATENT DOCUMENTS

| | | | |
|---|---|---|---|
| 9,834,336 B1 * | 12/2017 | Bowen | A47G 23/0633 |
| 2011/0168104 A1 * | 7/2011 | Matteson | A01K 1/03 119/472 |
| 2015/0024673 A1 * | 1/2015 | Phelps | F24F 13/16 454/333 |

FOREIGN PATENT DOCUMENTS

| | | | |
|---|---|---|---|
| KR | 20140014876 A * | 2/2014 | |
| WO | WO-03013231 A1 * | 2/2003 | A01K 1/03 |

OTHER PUBLICATIONS

Snyder Mfg. Co—Cat Housing Venting Options (posted on the Internet prior to Nov. 7, 2018 at www.snydermfg.com/products/venting-options).

Mason Company—Ventilation (posted on the Internet prior to Nov. 7, 2018 at masonco.com/by-application/ventilation.html).

Mason Company—Individual Product Spec Sheets (posted on the Internet prior to Nov. 7, 2018 at masonco.com/pdfs/resources/spec-sheets/cat_raintree_cat_condo.pdf).

* cited by examiner

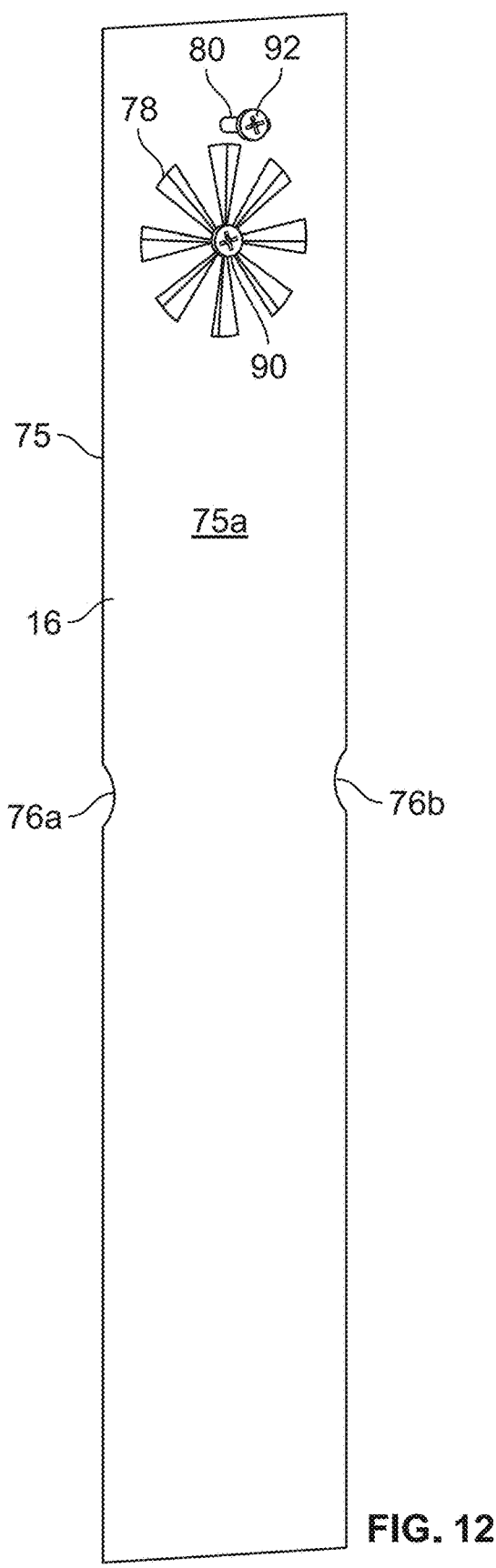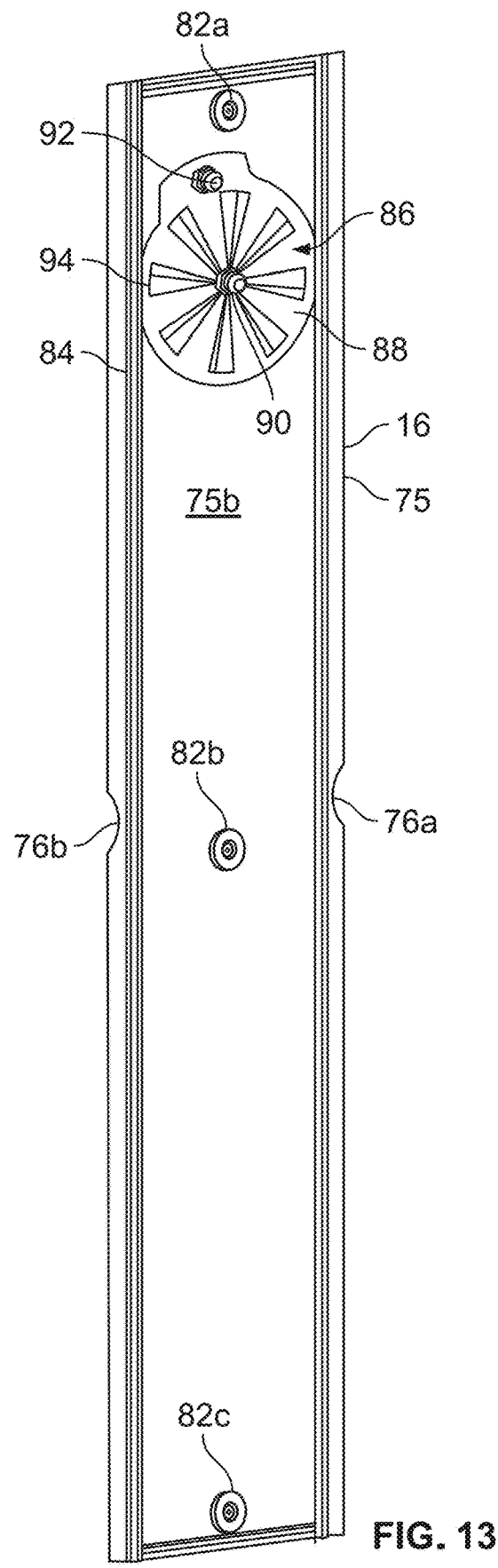
FIG. 12
FIG. 13

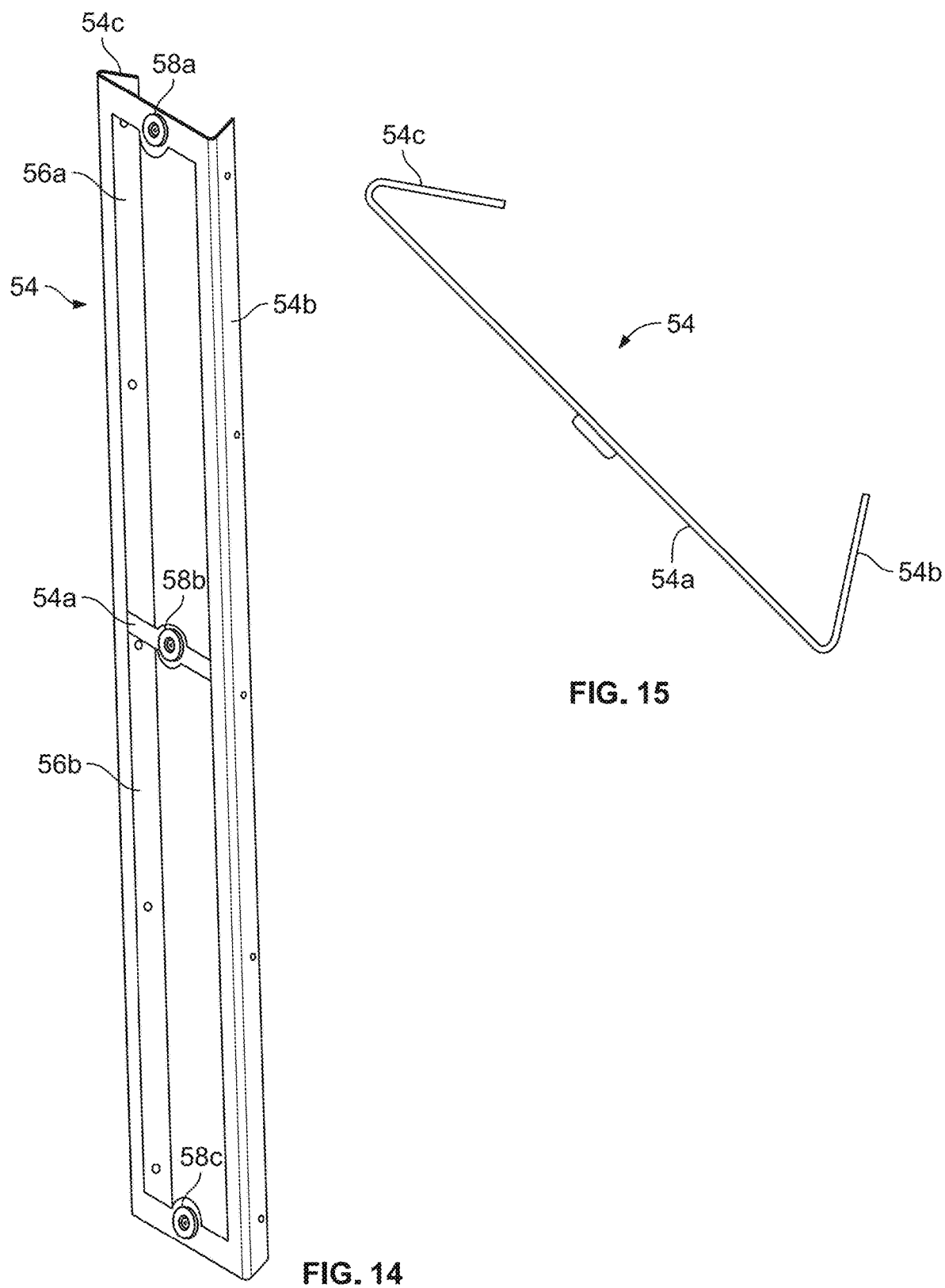

ANIMAL ENCLOSURE CONFIGURED FOR USE WITH A VENTILATION SYSTEM

CROSS-REFERENCE TO RELATED APPLICATIONS

This application is based on and claims priority to U.S. Provisional Application Ser. No. 62/756,813, filed on Nov. 7, 2018, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present invention relates generally to an animal enclosure and, more particularly, to an animal enclosure that is configured for use with a ventilation system.

2. Description of Related Art

A variety of different animal cages are used by veterinarians, pet owners, pet stores, and animal care professionals to safely house and contain one or more animals. Typical animal cages include a plurality of joined walls that enclose an interior space and a door for accessing the cage's interior. Animal cages may be joined together to form a bank of cages that can house a number of animals. While it is necessary and desirable in many circumstances to house animals in a cage or bank of cages, there may be negative consequences to housing animals in this manner. In most instances, cage ventilation is provided through passive air flow. This is facilitated by openings in cage doors or vents. However, there are certain housing applications where it is necessary or desirable to control ventilation. This includes situations where air flow needs to be managed for treatment applications and to prevent the spread of disease. Active ventilation control can also provide certain hygienic benefits such as the mitigation of undesirable odors.

When active ventilation control is in order, it is known to configure animal cages for use with ventilation systems that draw stale air, including airborne pathogens and odors within the air, from the cages. For example, one type of cage includes a generally vertical duct that is formed separate from the walls of the cage and is positioned in a corner of the cage. The duct extends from the floor to the ceiling of the cage. The duct may be joined with another duct in an adjacent cage positioned above or below the first cage. The duct may be joined to a fan system operable to draw air from the cages through the duct. Another type of cage bank includes walls that define a number of cages and ducts that are positioned between adjacent cages. Openings in the walls connect the cages to the ducts, and the ducts may be joined to a fan system for drawing air from the cages.

While these types of systems are generally able to improve the condition of the air within the cage or cage bank, the ducts occupy a relatively large amount of space within the cage or cage bank that would otherwise be available for use by an animal housed in the cage. Further, the space within the duct is not easily accessible for cleaning. In addition, when ducts of adjacent cages are joined, more air is drawn from the cage nearest the fan system than the cages that are farther away from the fan system.

BRIEF SUMMARY OF THE INVENTION

An animal enclosure in accordance with one embodiment of the invention described herein includes a wall assembly and an access panel that is configured to removably couple to the wall assembly. The wall assembly includes a plurality of walls that are coupled together to define an interior space. The wall assembly defines an opening configured for fluid connection to a ventilation system. When the access panel is coupled to the wall assembly, the access panel divides the interior space into a vent space, which is in fluid communication with the opening, and a living space. A vent opening formed in the access panel is configured to place the living space in fluid communication with the vent space. The ventilation system is preferably configured to induce air circulation by drawing air from the living space through the vent opening, the vent space, and the opening defined by the walls. In this manner, the ventilation system preferably can remove stale air, odors, and airborne pathogens from the interior space, and otherwise enhance air flow in and through the interior space, to improve the living conditions of the animal or animals within the animal enclosure and the working conditions of the workers servicing the animals. The access panel may be removed from its coupling with the wall assembly in order to access the vent space behind the access panel for cleaning or as otherwise desired. The access panel preferably occupies a minimal amount of floor space within the interior space to maximize the amount of living space available for any animal within the interior space. The access panel may be spaced above the wall defining a floor of the interior space so that no floor space is occupied by the access panel. The access panel may further include a damper system allowing a user to selectively determine how much of the vent opening is either open or closed for controlling the flow of air through the vent opening. The animal enclosure may be configured for housing any type of animal or animals, including one or more cats, and the living space may be configured to serve one or more functions, including a typical living space, a feeding area, and/or a litter area.

Another embodiment of animal enclosure in accordance with the invention includes a wall assembly and first and second panels coupled to the wall assembly. The wall assembly includes a plurality of walls coupled together to define a first interior space and a second interior space. An interior opening extends through one of the walls from the first interior space to the second interior space. The walls define an opening configured for fluid connection to a ventilation system. The first panel divides the first interior space into a first vent space, which is in fluid communication with the opening, and a first living space. A first vent opening formed in the first panel is configured to place the first living space in fluid communication with the first vent space. The second panel divides the second interior space into a second vent space, which is in fluid communication with the interior opening, and a second living space. A second vent opening formed in the second panel is configured to place the second living space in fluid communication with the second vent space. The ventilation system is preferably configured to draw air from the first living space and the second living space through the first and second vent openings, the first and second vent spaces, the interior opening, and the opening defined by the walls. The first and second panels may further include damper systems allowing a user to selectively determine how much of the first and second vent openings are either open or closed for controlling the flow of air through the vent openings. Preferably, the damper systems are operable to equalize the flow of air through the first vent opening and the second vent opening. The first interior space may be positioned above, below, or adjacent the second interior space. The wall assembly may further define third and fourth interior spaces positioned adjacent the first and second interior spaces. Additional interior openings in the wall assembly may place at least a portion of the third and fourth interior spaces in fluid communication with the first and second vent spaces, respectively. Third and fourth panels may be coupled to the wall assembly to divide the third and fourth interior spaces into third and fourth vent spaces, respectively, and third and fourth living spaces, respectively. Any number of interior spaces may be defined by the wall assembly each configured in a similar manner as described above.

An animal enclosure in accordance with another embodiment of the invention includes a wall assembly and first and second panels coupled to the wall assembly. The wall assembly includes a plurality of walls coupled together to define a first interior space and a second interior space. The walls define first and second openings each configured for fluid connection to a ventilation system. The first panel divides the first interior space into a first vent space, which is in fluid communication with the first opening, and a first living space. A first vent opening formed in the first panel is configured to place the first living space in fluid communication with the first vent space. The second panel divides the second interior space into a second vent space, which is in fluid communication with the second opening, and a second living space. A second vent opening formed in the second panel is configured to place the second living space in fluid communication with the second vent space. The ventilation system is preferably configured to draw air from the first living space and the second living space through the first and second vent openings, the first and second vent spaces, and the first and second openings defined by the walls. The wall assembly may define additional interior spaces each configured in a similar manner as described above.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 12 is a front perspective view of the first access panel;

FIG. 13 is a rear perspective view of the first access panel shown in FIG. 12;

FIG. 14 is a front perspective view of a first access panel mount;

FIG. 15 is a top plan view of the first access panel mount shown in FIG. 14;

DETAILED DESCRIPTION OF PREFERRED EMBODIMENT

Figure 1:
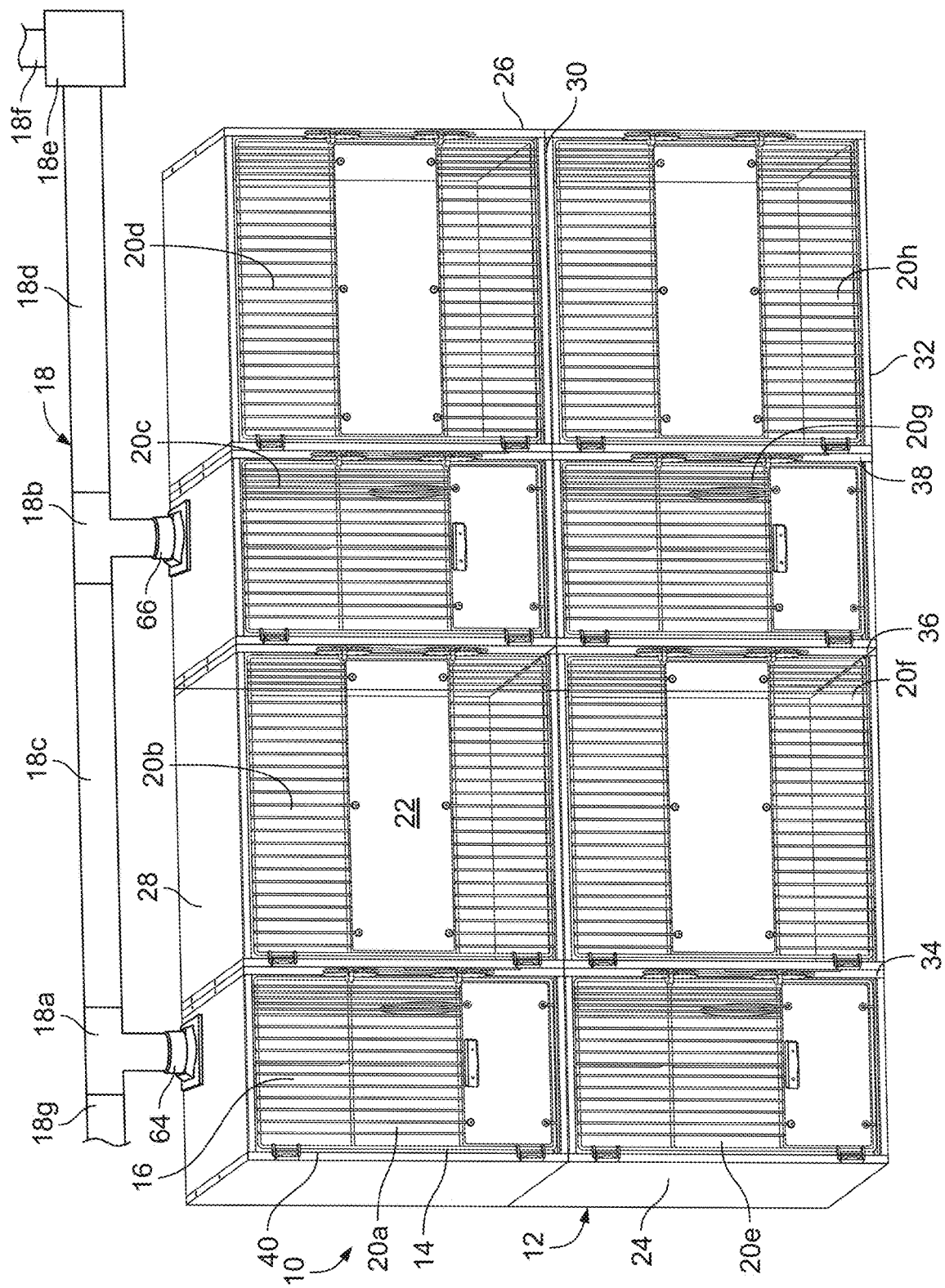
FIG. 1 is a perspective view of an animal enclosure configured for use with a ventilation system in accordance with one embodiment of the invention described herein.

An animal enclosure in accordance with the invention described herein is identified generally as 10 in FIG. 1. Animal enclosure 10 includes a wall assembly 12, a plurality of doors, one of which is identified as 14, coupled to the wall assembly 12, and a plurality of access panels, one of which is identified as 16 in FIG. 1. Animal enclosure 10 is configured for use with a ventilation system 18. As described in more detail below, ventilation system 18 is operable to induce air circulation by drawing air from a plurality of interior spaces 20*a-h* defined by wall assembly 12. In this manner, ventilation system 18 can remove stale air, odors, and airborne pathogens from the interior spaces 20*a-h*, and otherwise enhance air flow in and through interior spaces 20*a-h*, to improve the living conditions of the animals within the animal enclosure 10 and the working conditions of the workers servicing the animals. Animal enclosure 10 is preferably configured for housing cats, but it is within the scope of the invention for the animal enclosure 10 to be configured for housing any type of animal.

Wall assembly 12 includes a plurality of walls that are joined together to define interior spaces 20*a-h*. Specifically, wall assembly 12 includes a rear wall 22, a first side wall 24, a second side wall 26, an upper wall 28, a middle wall 30, a lower wall 32, a first divider 34, a second divider 36, and a third divider 38. Rear wall 22, first side wall 24, upper wall 28, middle wall 30, and first divider 34 form a first interior space 20a. Rear wall 22, upper wall 28, middle wall 30, first divider 34, and second divider 36 form a second interior space 20b. Rear wall 22, upper wall 28, middle wall 30, second divider 36, and third divider 38 form a third interior space 20c. Rear wall 22, second side wall 26, upper wall 28, middle wall 30, and third divider 38 form a fourth interior space 20d. Rear wall 22, first side wall 24, middle wall 30, lower wall 32, and first divider 34 form a fifth interior space 20e. Rear wall 22, middle wall 30, lower wall 32, first divider 34, and second divider 36 form a sixth interior space 20f. Rear wall 22, middle wall 30, lower wall 32, second divider 36, and third divider 38 form a seventh interior space 20g. Rear wall 22, second side wall 26, middle wall 30, lower wall 32, and third divider 38 form an eighth interior space 20g. First, second, third, and fourth interior spaces 20a-d are positioned above fifth, sixth, seventh, and eighth interior spaces 20e-h, respectively. Wall assembly 12 forms eight openings, one of which is identified as 40, positioned opposite rear wall 22 through which interior spaces 20a-h are accessible. Door 14 is rotatably coupled to wall assembly 12 adjacent opening 40 and is moveable between the closed position shown in FIG. 1 and an open position (not shown) for controlling access to and exit from interior space 20a. As shown in FIG. 1, seven other doors are also rotatably coupled to wall assembly 12 in a similar manner as door 14 for controlling access to and exit from interior spaces 20b-h.

Preferably, each of the interior spaces 20a-h is formed from five separate walls that are joined together to form a rectangular cuboid or box with an opening 40 opposite rear wall 22. In this manner, rear wall 22 is preferably formed from eight separate sections, one for each of interior spaces 20a-h. First side wall 24 is preferably formed from two separate sections, one for each of interior spaces 20a and 20e. Second side wall 26 is preferably formed from two separate sections, one for each of interior spaces 20d and 20h. Upper wall 28 is preferably formed from four separate sections, one for each of interior spaces 20a-d. Middle wall 30 is preferably formed from eight separate sections, one for each of interior spaces 20a-h. Lower wall 32 is preferably formed from four separate sections, one for each of interior spaces 20e-h. First divider 34 is preferably formed from four separate sections, one for each of interior spaces 20a, 20b, 20e, and 20f. Second divider 36 is preferably formed from four separate sections, one for each of interior spaces 20b, 20c, 20f, and 20g. Third divider 38 is preferably formed from four separate sections, one for each of interior spaces 20c, 20d, 20g, and 20h. The different sections of wall assembly 12 may be physically joined together with connectors or fasteners or merely placed on top of each other or adjacent each other to form wall assembly 12. While preferably each of rear wall 22, first side wall 24, second side wall 26, upper wall 28, middle wall 30, lower wall 32, first divider 34, second divider 36, and third divider 38 is formed from a plurality of sections as described above, it is also within the scope of the invention for each of rear wall 22, first side wall 24, second side wall 26, upper wall 28, middle wall 30, lower wall 32, first divider 34, second divider 36, and third divider 38 to be formed as a single, integral wall or divider.

Referring to interior space 20a, the section of upper wall 28 forming and adjacent interior space 20a may be referred to as a ceiling for interior space 20a, the section of middle wall 30 forming and adjacent interior space 20a may be referred to as a floor for interior space 20a, and the section of first divider 34 forming and adjacent interior space 20a may be referred to as a side wall for interior space 20a. This same terminology may be used with respect to the remainder of interior spaces 20b-h such that sections of upper wall 28 may be referred to as a ceiling for interior spaces 20b-d, sections of middle wall 30 may be referred to as a floor for interior spaces 20b-d, sections of middle wall 30 may be referred to as a ceiling for interior spaces 20e-h, sections of lower wall 32 may be referred to as a floor for interior spaces 20e-h, sections of first divider 34 may be referred to as a side wall for interior spaces 20b, 20e, and 20f, sections of second divider 36 may be referred to as a side wall for interior spaces 20b-c and 20f-g, and sections of third divider 38 may be referred to as a side wall for interior spaces 20c-d and 20g-h.

The configuration of the combination of interior spaces 20a, 20b, 20e, and 20f and the wall assembly 12 surrounding interior spaces 20a, 20b, 20e, and 20f is preferably substantially similar to the configuration of the combination of interior spaces 20c, 20d, 20g, and 20h and the wall assembly 12 surrounding interior spaces 20c, 20d, 20g, and 20h. Accordingly, only interior spaces 20a, 20b, 20e, and 20f and the surrounding wall assembly 12 are described in detail herein. Interior spaces 20a and 20e are preferably configured as litter areas for an animal (e.g., a cat), and interior spaces 20b and 20f are preferably configured as living areas for an animal. An opening 42 (FIG. 10) in first divider 34 connects interior space 20a to interior space 20b, and an opening 44 connects interior space 20e to interior space 20f. Openings 42 and 44 are preferably sized so that a cat can pass through the openings 42, 44. Preferably, openings 42 and 44 may be blocked by a removable panel (not shown) that is insertable in a slot (not shown) in first divider 34. Thus, interior spaces 20a and 20b in combination may be used to house a single cat or group of cats, or, if opening 42 is blocked, interior spaces 20a and 20b may each be used to house a single cat or group of cats. Likewise, interior spaces 20e and 20f in combination may be used to house a single cat or group of cats, or, if opening 44 is blocked, interior spaces 20e and 20f may each be used to house a single cat or group of cats.

Figure 10:
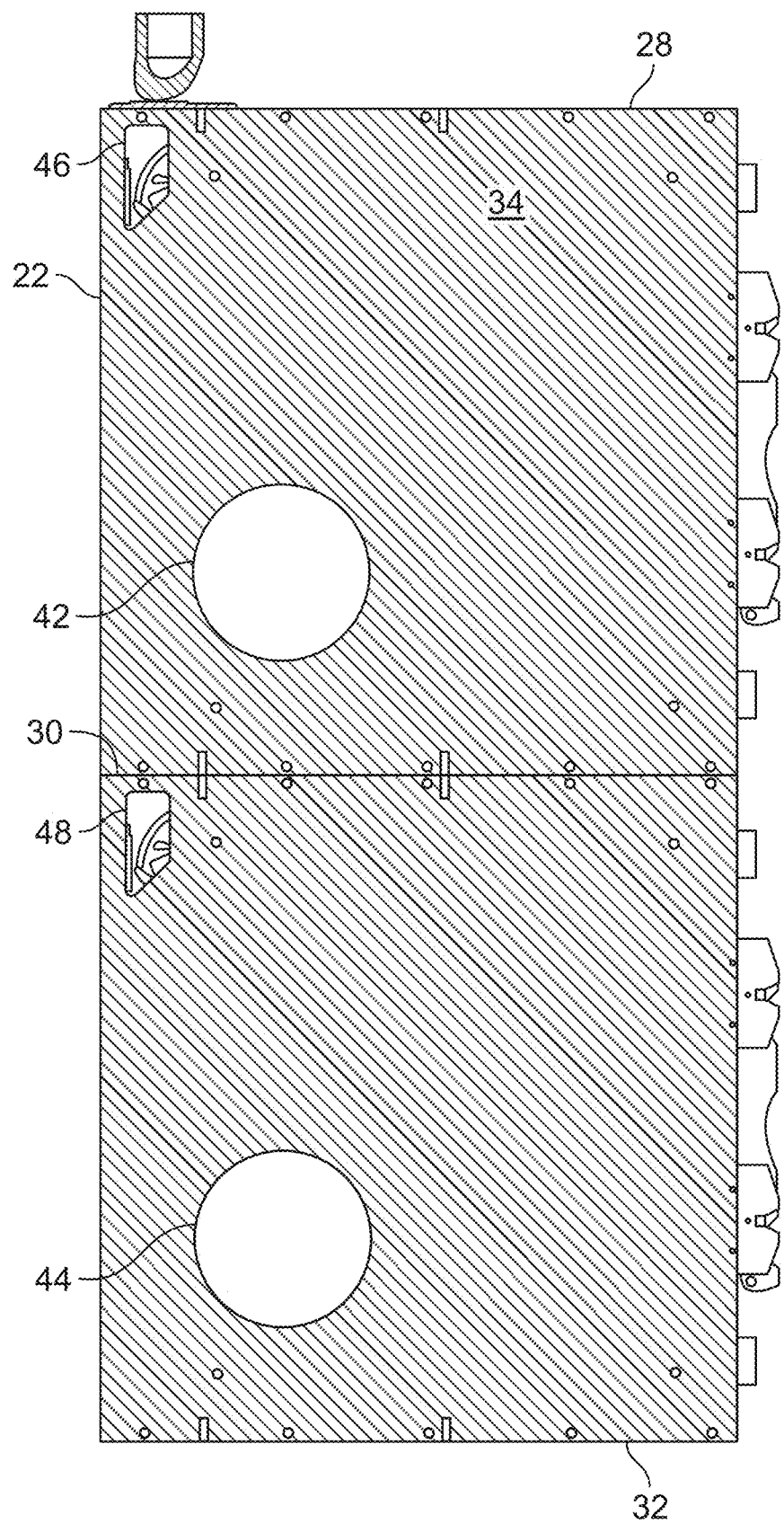
FIG. 10 is a cross-sectional view taken through the line 10-10 in FIG. 2.
Figure 11:
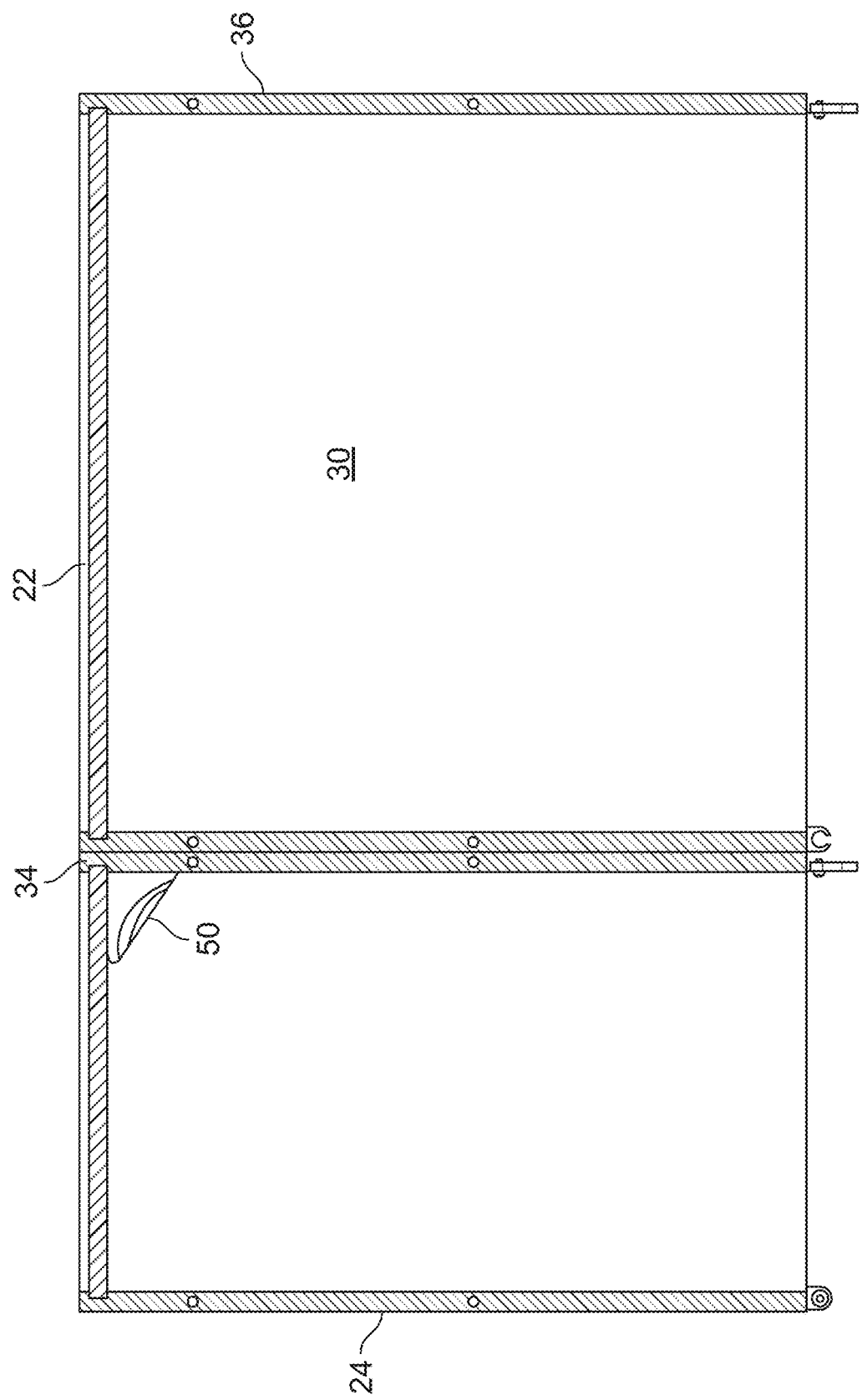
FIG. 11 is a cross-sectional view taken through the line 11-11 in FIG. 2.

Referring to FIG. 10, first divider 34 includes an interior opening 46 that places interior space 20a in fluid communication with interior space 20b, and an interior opening 48 that places interior space 20e in fluid communication with interior space 20f. Interior opening 46 is positioned in an upper corner of first divider 34 adjacent rear wall 22 and upper wall 28. Interior opening 48 is positioned in a corner of interior space 20e adjacent rear wall 22 and below middle wall 30. Referring to FIG. 11, middle wall 30 includes an interior opening 50 that places interior space 20a in fluid communication with interior space 20e. Interior opening 50 is positioned in a corner of interior space 20a adjacent rear wall 22 and first divider 34. As described in more detail below, interior openings 46, 48, and 50 allow ventilation system 18 to draw air from interior spaces 20a-b and 20e-f through a single exterior opening 52 (shown in FIG. 3) in upper wall 28.

Figure 6:
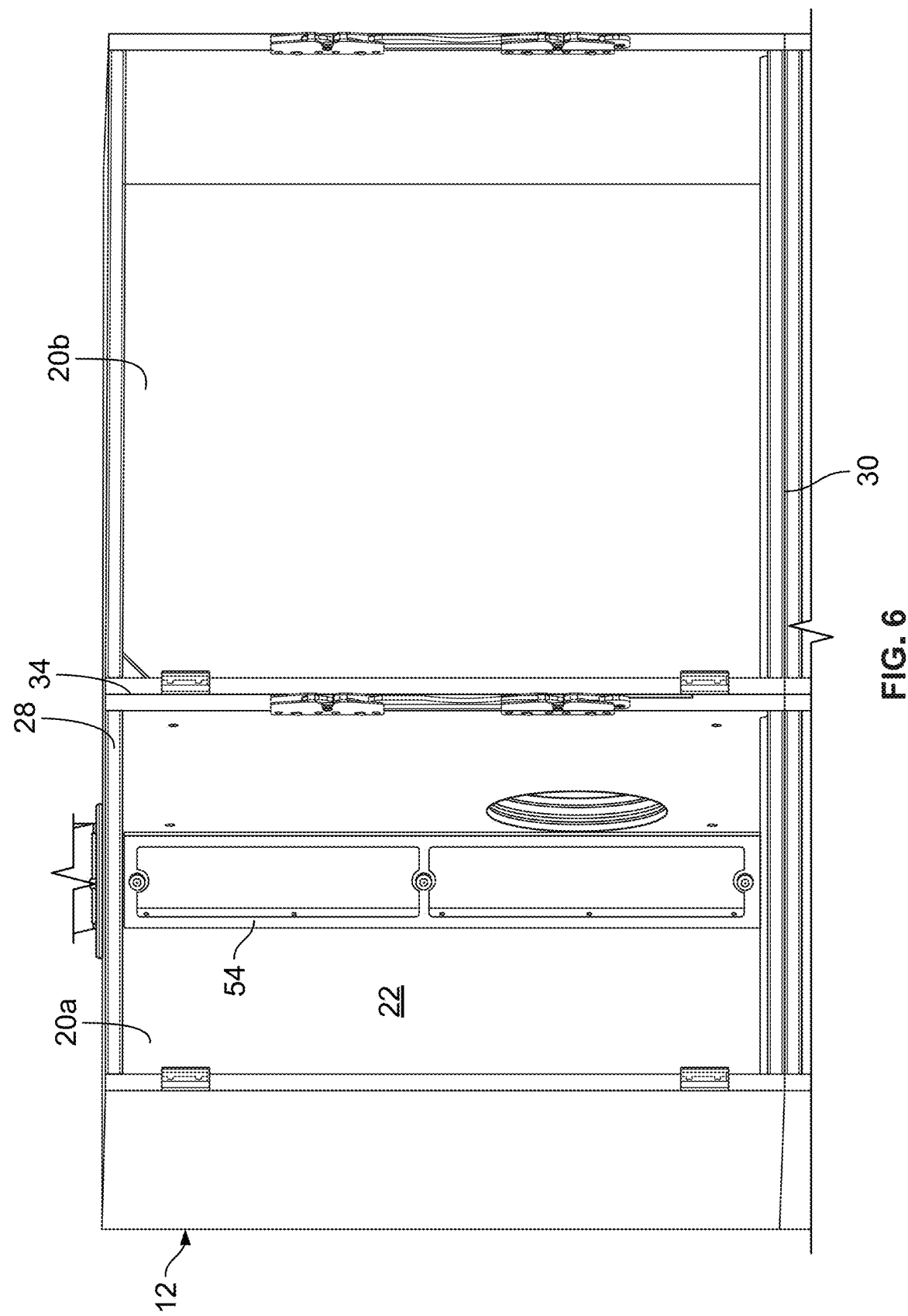
FIG. 6 is a front perspective view of the animal enclosure as shown in FIG. 4 with the first access panel removed.

As shown in FIG. 6, wall assembly 12 includes an access panel mount 54 that is mounted to rear wall 22 and first divider 34 in a corner of interior space 20a. Referring to FIGS. 14 and 15, access panel mount 54 includes a front surface 54a and side surfaces 54b and 54c each formed integrally with front surface 54a and extending rearward from front surface 54a. Front surface 54a includes two large openings 56a-b. Side surfaces 54b-c are mounted to first divider 34 and rear wall 22 (as shown in FIG. 6), respectively, preferably with fasteners (not shown). The configuration of access panel mount 54 spaces front surface 54a away from the corner where rear wall 22 and first divider 34 meet. Access panel mount 54 extends vertically from upper wall 28 to middle wall 30. Exterior opening 52 (FIG. 3) and access panel mount 54 are configured so that exterior opening 52 is positioned behind front surface 54a. Further, interior opening 46 (FIG. 10) and access panel mount 54 are configured so that interior opening 46 is positioned behind front surface 54a, and interior opening 50 (FIG. 11) and access panel mount 54 are configured so that interior opening 50 is positioned behind front surface 54a. Access panel mount 54 includes three magnets 58a-c mounted to the top, middle, and bottom, respectively, of front surface 54a. Magnets 58a-c may be mounted to front surface 54a with fasteners (e.g., screws or rivets) as shown or any other suitable means. Another access panel mount (not shown) similar to access panel mount 54 is mounted to rear wall 22 and third divider 38 within interior space 20c.

Figure 9:
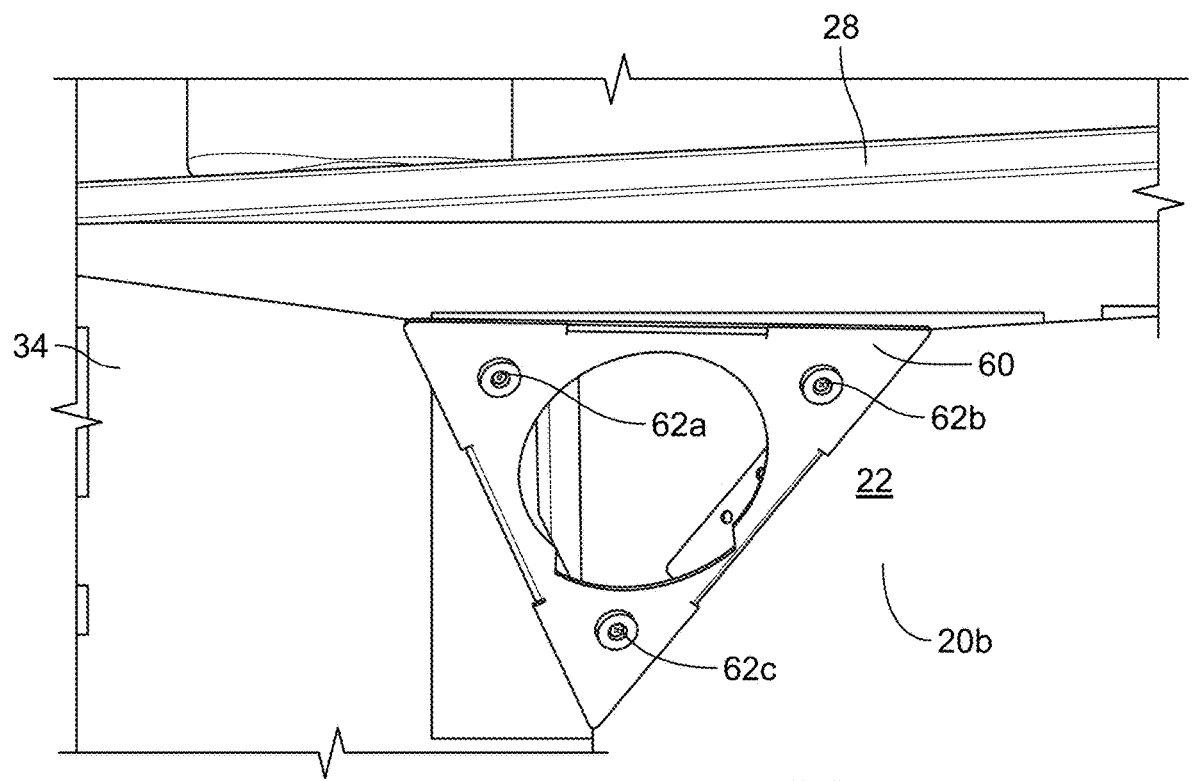
FIG. 9 is a front perspective view of the second interior space as shown in FIG. 7 with the second access panel removed.
Figure 16:
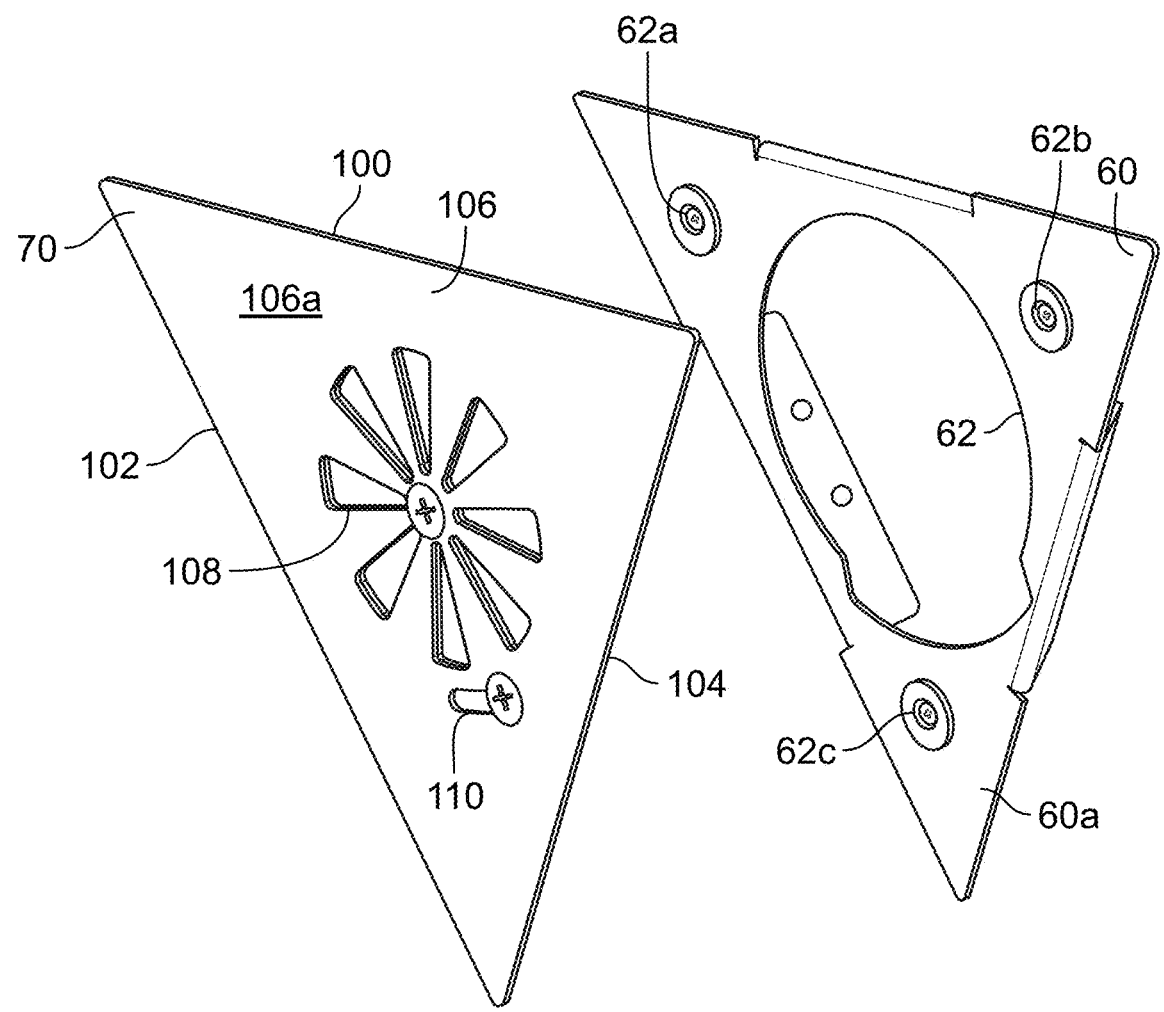
FIG. 16 is a front, perspective, exploded view of the second access panel and a second access panel mount.
Figure 17:
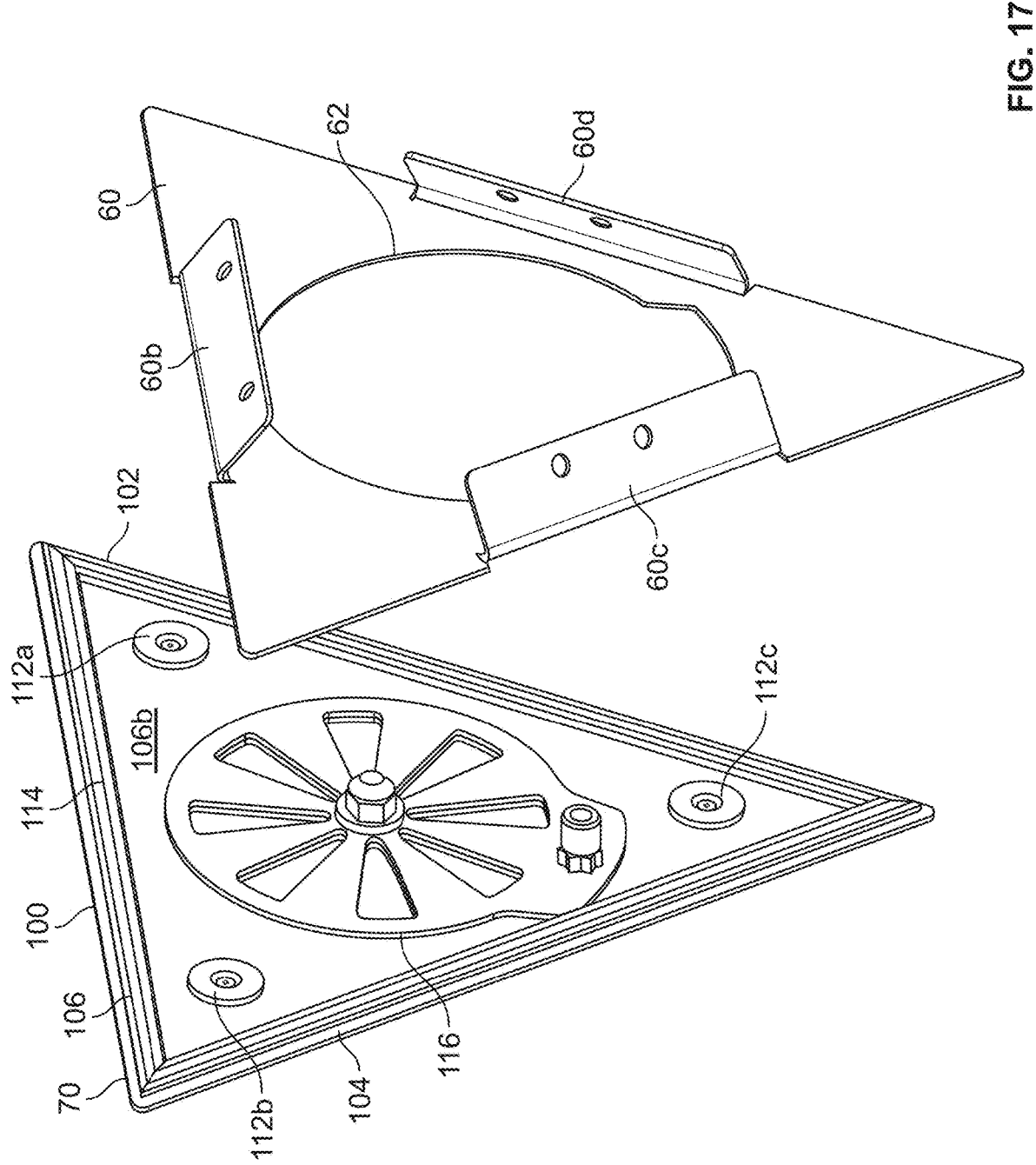
FIG. 17 is a rear, perspective, exploded view of the second access panel and the second access panel mount.

Referring to FIGS. 9, 16, and 17, wall assembly 12 includes another access panel mount 60 that is mounted to rear wall 22, upper wall 28, and first divider 34 in a corner of interior space 20b. Access panel mount 60 is generally triangular and includes a front surface 60a (FIG. 16) and side surfaces 60b-d (FIG. 17) each formed integrally with front surface 60a and extending rearward from front surface 60a. Front surface 60a includes a generally circular opening 62. Side surfaces 60b-d are mounted to upper wall 28, rear wall 22, and first divider 34, respectively, preferably with fasteners (not shown). The configuration of access panel mount 60 spaces front surface 60a away from the corner where rear wall 22, upper wall 28, and first divider 34 meet. Interior opening 46 (FIG. 10) and access panel mount 60 are configured so that interior opening 46 is positioned behind front surface 60a. Access panel mount 60 includes three magnets 62a-c each mounted adjacent a corner of front surface 60a. Magnets 62a-c may be mounted to front surface 60a with fasteners (e.g., screws or rivets) as shown or any other suitable means. Other access panel mounts (not shown) similar to access panel mount 60 are positioned in corners of interior spaces 20d-h. Specifically, an access panel mount (not shown) is mounted to rear wall 22, upper wall 28, and third divider 38 within interior space 20d, an access panel mount (not shown) is mounted to rear wall 22, middle wall 30, and first divider 34 within interior space 20e, an access panel mount (not shown) is mounted to rear wall 22, middle wall 30, and first divider 34 within interior space 20f, an access panel mount (not shown) is mounted to rear wall 22, middle wall 30, and third divider 38 within interior space 20g, and an access panel mount (not shown) is mounted to rear wall 22, middle wall 30, and third divider 38 within interior space 20h. The access panel mount (not shown) positioned in interior space 20e is configured so that interior openings 48 (FIG. 10) and 50 (FIG. 11) are positioned behind the front surface of the access panel mount. Further, the access panel mount (not shown) positioned in interior space 20f is configured so that interior opening 48 (FIG. 10) is positioned behind the front surface of the access panel mount.

Figure 2:
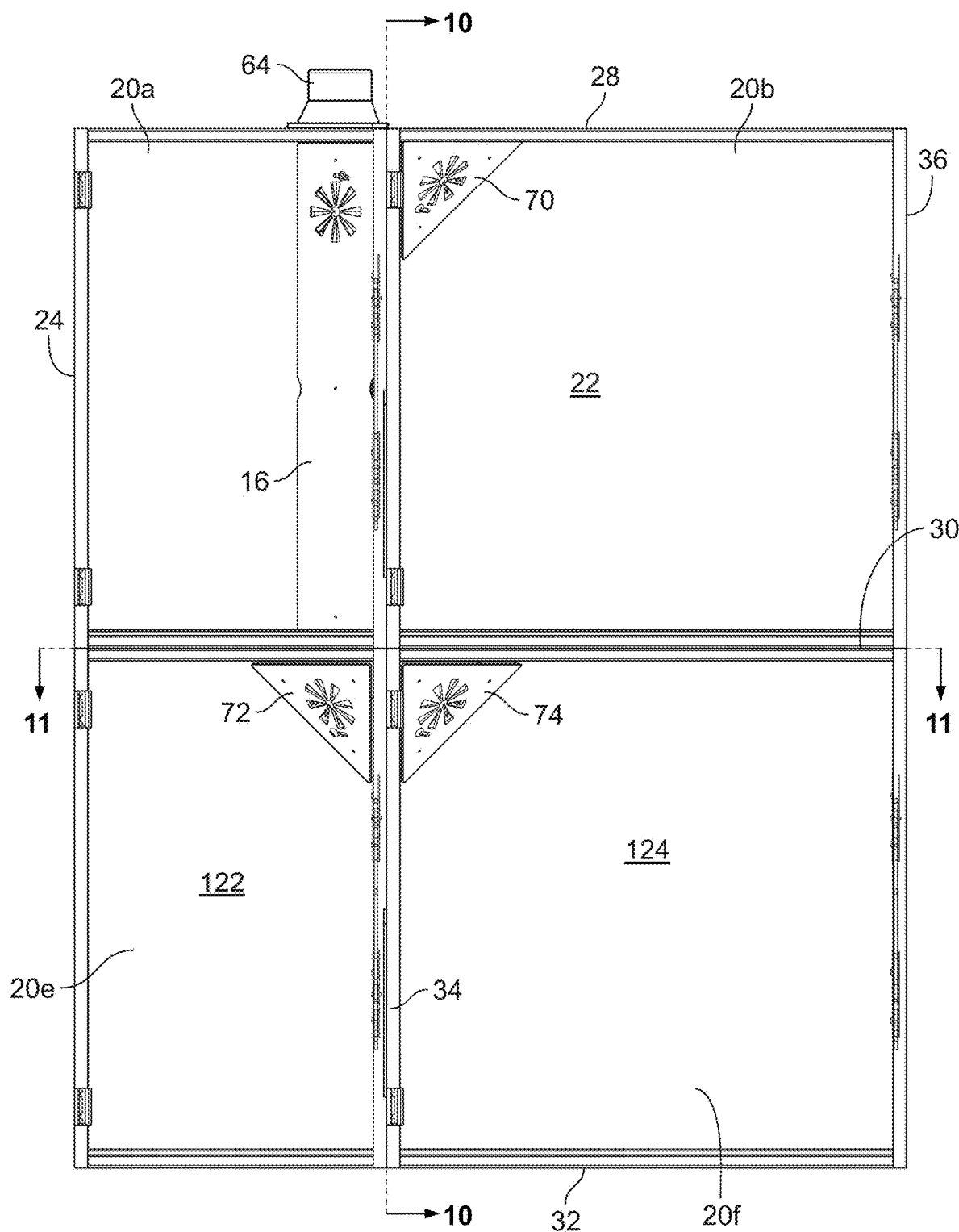
FIG. 2 is a front elevational view of a portion of the animal enclosure of FIG. 1 shown without doors for clarity.
Figure 3:
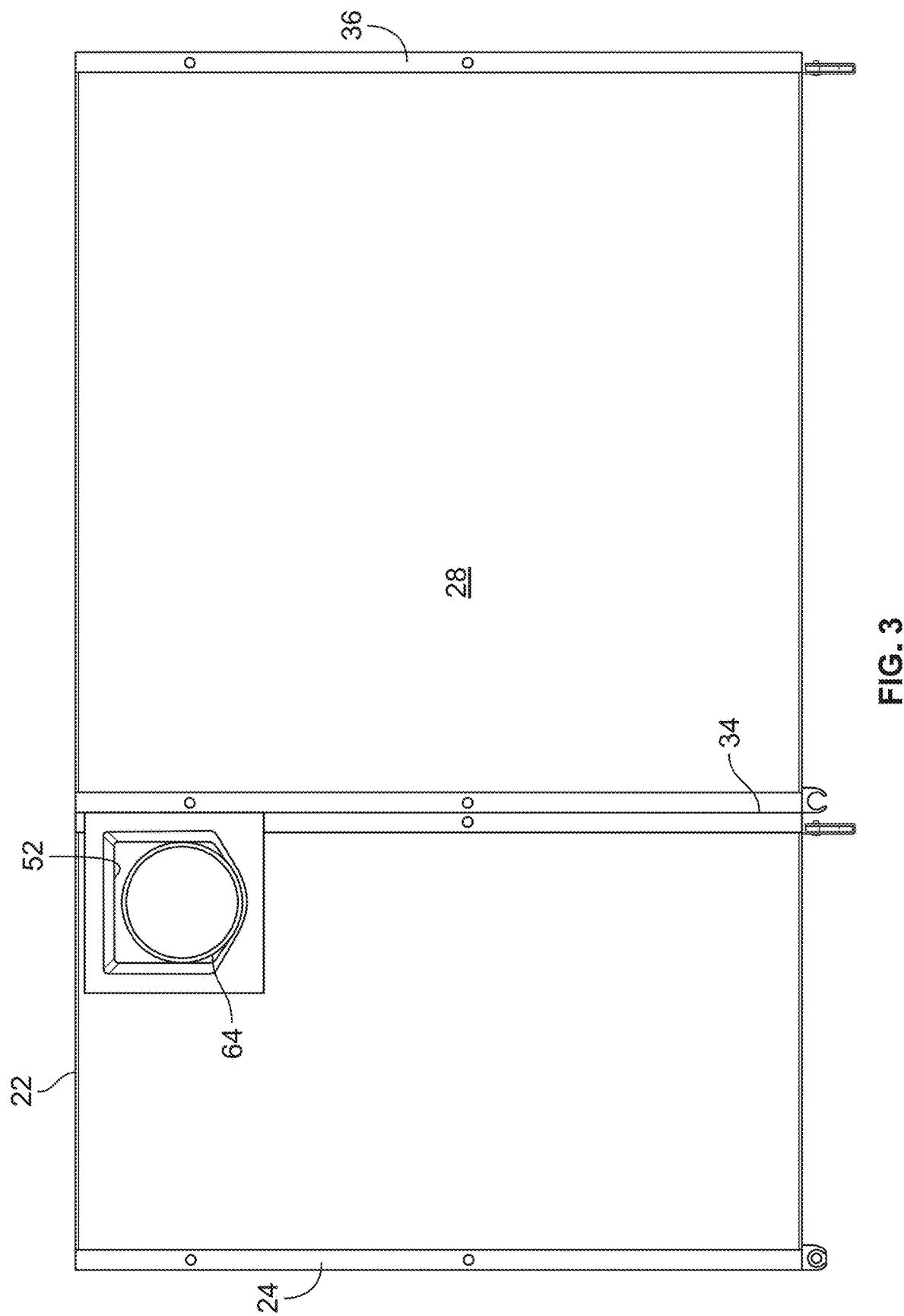
FIG. 3 is a top plan view of the portion of the animal enclosure shown in FIG. 2.
Figure 4:
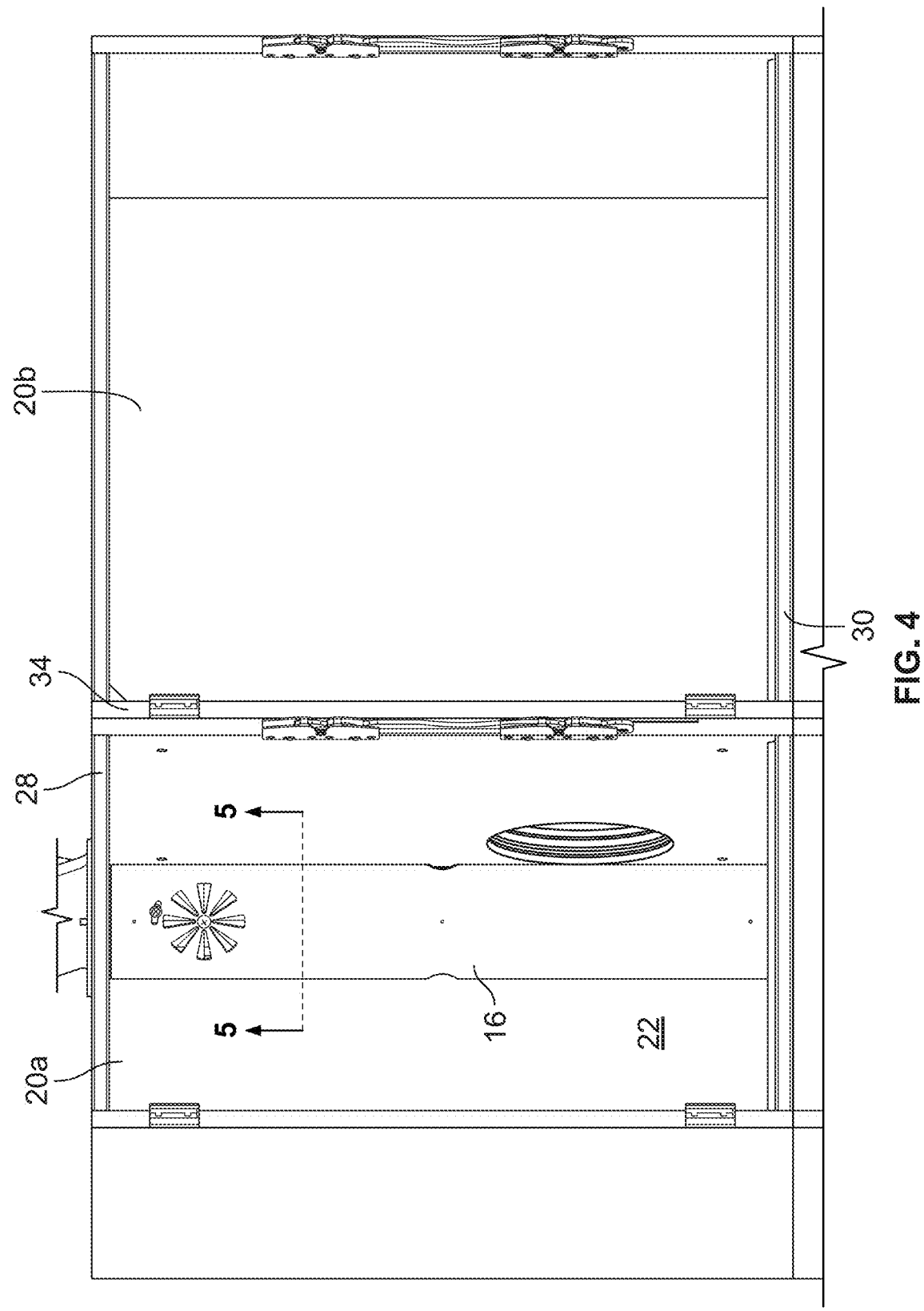
FIG. 4 is a front perspective view of first and second interior spaces of the animal enclosure of FIG. 1 showing a first access panel in the first interior space.

A vent connector 64, shown in FIGS. 1-3, is mounted to upper wall 28 so that it covers exterior opening 52 (FIG. 3). Another vent connector 66, shown in FIG. 1, is mounted to upper wall 28 so that it covers an exterior opening (not shown) similar to exterior opening 52. Each of the vent connectors 64 and 66 has a base that covers one of the exterior openings through upper wall 28 and a cylindrical top section. The cylindrical top section is configured for attachment to ventilation system 18. Vent connectors 64 and 66 are conduits that place interior spaces 20a-20h in fluid communication with ventilation system 18. Ventilation system 18 preferably includes T-shaped ducts 18a-b that are attached to vent connectors 64 and 66, respectively. A linear duct 18c extends between T-shaped ducts 18a-b, and another linear duct 18d extends from T-shaped duct 18b to an exhaust fan 18e. Exhaust fan 18e is operable to draw air from interior spaces 20a-h through ducts 18a-d. An exhaust duct 18f is coupled to exhaust fan 18e for discharging air drawn by exhaust fan 18e preferably exteriorly of a building within which animal enclosure 10 is positioned. Another linear duct 18g may extend from T-shaped duct 18a to another animal enclosure (not shown) similar to animal enclosure 10. In other configurations of animal enclosure 10 that are within the scope of the present invention, exterior opening 52 and the other exterior opening (not shown) in upper wall 28 may extend through rear wall 22. Exterior opening 52 may also extend through first divider 34 in an embodiment of animal enclosure 10 that does not include interior spaces 20b-h, as described in more detail below. Further, exterior opening 52 may extend through first side wall 24 in an embodiment of animal enclosure 10 in which access panel mount 54 is positioned on the opposite side of interior space 20a and mounted to first side wall 24 instead of first divider 34.

Referring to FIG. 2, animal enclosure 10 includes first, second, third, and fourth access panels 16, 70, 72, and 74 that are each removably coupled to the access panel mounts of wall assembly 12 and positioned within interior spaces 20a, 20b, 20e, and 20f, respectively. Access panels 16, 70, 72, and 74 are removably coupled to wall assembly 12 so that access panels 16, 70, 72, and 74 may be removed to access the space behind access panels 16, 70, 72, and 74 for cleaning or as otherwise desired. Animal enclosure 10 further includes an additional four access panels (not shown) that are substantially similar to access panels 16, 70, 72, and 74, removably coupled to wall assembly 12, and positioned within interior spaces 20c, 20d, 20g, and 20h.

First access panel 16 is configured to removably mount to access panel mount 54 (FIG. 6) within interior space 20a. When first access panel 16 is mounted to access panel mount 54, the width of first access panel 16 is preferably configured so that first access panel 16 extends from rear wall 22 to first divider 34, and the length of first access panel 16 is preferably configured so that first access panel 16 extends from upper wall 28 to middle wall 30. First access panel 16 may abut, or be positioned directly adjacent to rear wall 22, first divider 34, upper wall 28, and middle wall 30. The positioning of first access panel 16 and access panel mount 54 in the corner of interior space 20a is preferably designed so that a minimal amount of floor space (i.e., middle wall 30) is positioned behind first access panel 16. For example, if middle wall 30 has an area of approximately 450 square inches within interior space 20a, the portion of middle wall 30 positioned behind first access panel 16 may be only approximately 7.6 square inches, which is approximately 1.7% of the area of middle wall 30 within interior space 20a. Preferably, the area of middle wall 30 within interior space 20a is between approximately 200-700 square inches, more preferably between approximately 300-600 square inches, and most preferably between approximately 400-500 square inches. Preferably, the portion of middle wall 30 positioned behind first access panel 16 is less than 15 square inches, more preferably is less than 12 square inches, and most preferably is less than 9 square inches. As shown in FIGS. 12 and 13, first access panel 16 includes a base 75 that is generally rectangular with two rounded slots 76a-b on opposing sides to facilitate grasping by a user. Base 75 includes a front surface 75*a* shown in FIG. 12 and a rear surface 75*b* shown in FIG. 13. A plurality of triangular shaped vent openings 78 extend through base 75. Vent openings 78 are positioned so they each extend radially outward from a center point. Further, vent openings 78 are positioned so they are approximately equidistant from each other with solid portions of base 75 positioned between adjacent vent openings 78. Each of the solid portions of base 75 positioned between adjacent vent openings 78 is approximately the same size as one of the vent openings 78. Vent openings 78 are aligned with opening 56*a* in access panel mount 54 when first access panel 16 is coupled to access panel mount 54. A slot 80 through base 75 is positioned above vent openings 78 and extends along a radial arc with a center point at the middle of vent openings 78.

Figure 5:
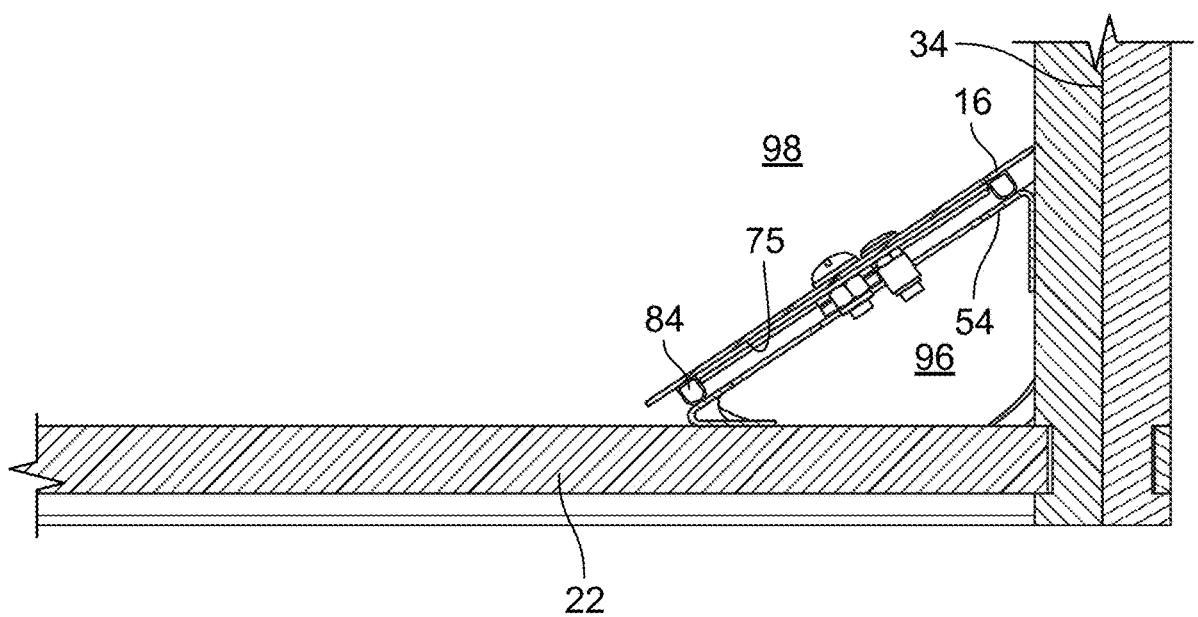
FIG. 5 is a cross-sectional view taken through the line 5-5 in FIG. 4.

Referring to FIG. 13, first access panel 16 includes three magnets 82*a-c* mounted to the top, middle, and bottom, respectively, of rear surface 75*b*. Magnets 82*a-c* are preferably spaced apart and positioned so that they are operable to removably couple to magnets 58*a-c*, respectively, of access panel mount 54 (FIG. 14). Magnets 82*a-c* may be mounted to rear surface 75*b* with fasteners (e.g., screws or rivets) as shown or any other suitable means. A seal 84 is mounted to rear surface 75*b* and extends around a peripheral edge of rear surface 75*b*. Seal 84 may be formed from a plurality of sections each mounted along one side of rear surface 75*b*. Seal 84 is preferably a D-shaped seal, as shown in FIG. 5; however, other types of seals are within the scope of the present invention. When first access panel 16 is mounted to access panel mount 54, as shown in FIG. 5, seal 84 preferably sealingly engages access panel mount 54 to prevent any substantial amount of air flow between first access panel 16 and access panel mount 54.

First access panel 16 further includes a damper system 86 (FIG. 13) mounted to base 75 that is operable to selectively uncover and cover vent openings 78. Damper system 86 comprises a generally circular plate 88 that is mounted to base 75 with a fastener 90, which allows plate 88 to rotate with respect to base 75. Fastener 90 extends through base 75 at a center point of vent openings 78. Another fastener 92 extends through slot 80 and is coupled to plate 88. When tightened, fastener 92 is operable to releasably lock plate 88 to base 75 to prevent rotation of plate 88 with respect to base 75. Fastener 92 also limits the range of rotation of plate 88 to the length of slot 80. Plate 88 includes a plurality of openings 94 that are preferably sized and positioned in substantially the same manner as vent openings 78. When plate 88 is rotated so that fastener 92 abuts one end of slot 80 (the right end of slot 80 as shown in FIG. 12), the openings 94 in plate 88 are preferably aligned with the vent openings 78 in base 75 to allow air flow through first access panel 16. When plate 88 is rotated so that fastener abuts the opposite end of slot 80 (the left end of slot 80 as shown in FIG. 12), the solid sections of plate 88 that are positioned between openings 94 are preferably aligned with the vent openings 78 in base 75 to prevent air flow through first access panel 16. Plate 88 may be rotated to any position between the two positions described above to selectively cover or uncover a portion of the vent openings 78. First access panel 16 may include another type of damper system that allows a user to selectively open and close vent openings in the access panel other than the damper system 86 described above. For example, first access panel 16 may include a damper system that is configured as a sliding plate or as shutters. Further, in some embodiments, damper system 86 can be omitted entirely such that the vent openings 78 through first access panel 16 always permit air to flow through base 75.

When first access panel 16 is mounted to wall assembly 12, first access panel 16 divides interior space 20*a* into a vent space 96 and a living space 98, as shown in FIG. 5. The vent space 96 is the space positioned between the rear surface 75*b* of first access panel 16, rear wall 22, first divider 34, upper wall 28, and middle wall 30. The living space 98 includes the remainder of interior space 20*a* not including the vent space 96. Vent space 96 is in fluid communication with exterior opening 52 (FIG. 3), interior opening 46 (FIG. 10), and interior opening 50 (FIG. 11). Vent openings 78 and damper system 86 are configured to place the living space 98 in fluid communication with the vent space 96. Except for air passing through vent openings 78, vent space 96 is preferably substantially sealed from living space 98 to prevent the passage of air between vent space 96 and living space 98. The connection between access panel mount 54 and wall assembly 12, and the sealing engagement between first access panel 16 and access panel mount 54, preferably seals vent space 96 from living space 98. The term living space when used herein refers to the portion of interior space 20*a* that does not include vent space 96. The living space 98 may be designed for use by an animal for any purpose and can be configured as a litter space, particularly when animal enclosure 10 is used to house one or more cats.

Figure 7:
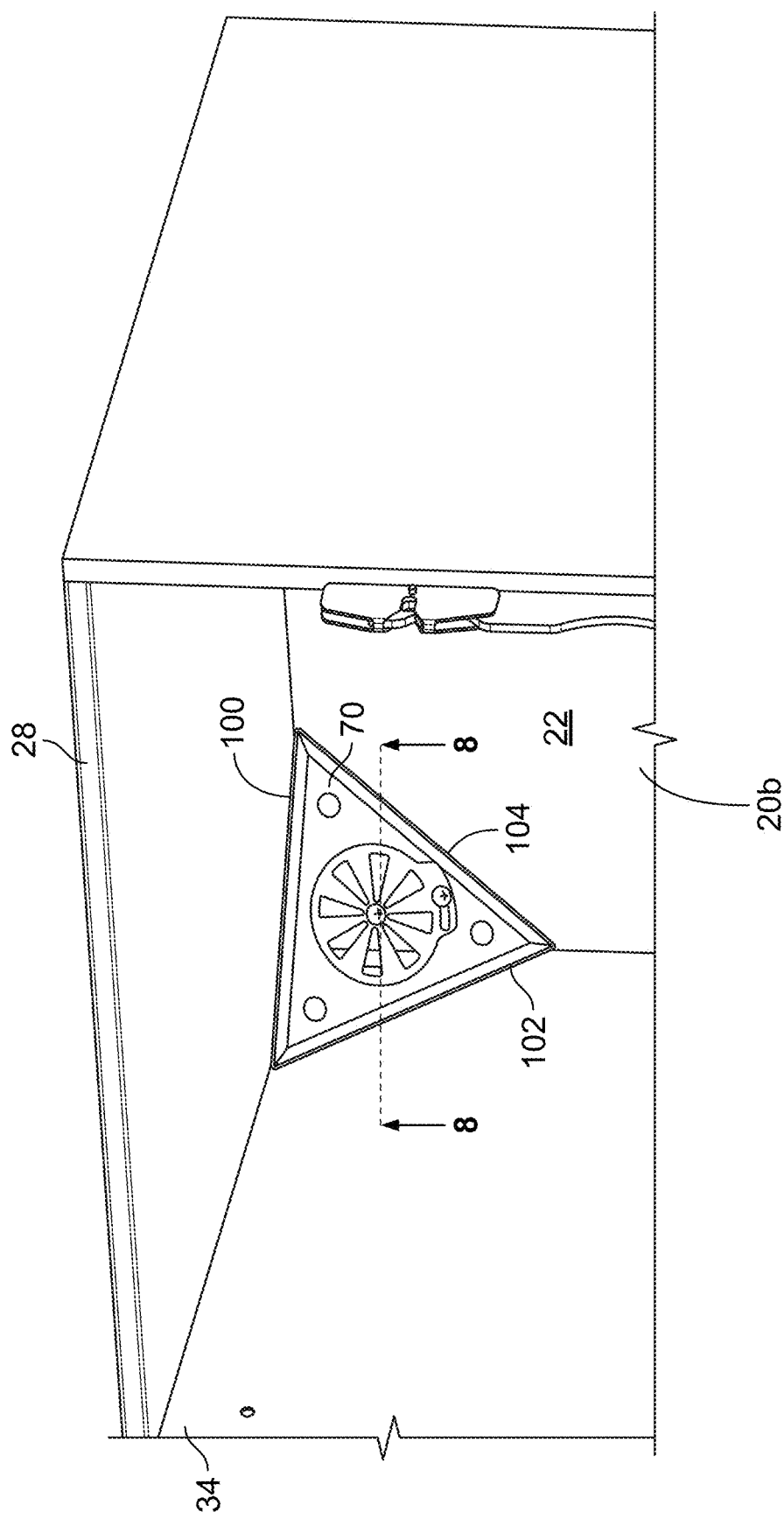
FIG. 7 is a front perspective view of the second interior space of the animal enclosure of FIG. 1 showing a second access panel.

Second access panel 70, shown in FIGS. 2, 7, 8, 16, and 17, is configured to removably mount to access panel mount 60 (FIG. 9) within interior space 20*b*. Second access panel 70 has a generally triangular shape. When second access panel 70 is mounted to access panel mount 60, as shown in FIG. 7, second access panel 70 is preferably configured so that: a first side 100 extends from a corner where first divider 34 abuts upper wall 28 to a corner where rear wall 22 abuts upper wall 28, a second side 102 extends from a corner where first divider 34 abuts upper wall 28 to a corner where rear wall 22 abuts first divider 34, and a third side 104 extends from a corner where rear wall 22 abuts first divider 34 to a corner where rear wall 22 abuts upper wall 28. Second access panel 70 may abut, or be positioned directly adjacent to rear wall 22, first divider 34, and upper wall 28. The positioning of second access panel 70 in an upper corner of interior space 20*b* is designed so that second access panel 70 is positioned above the floor (i.e., middle wall 30) of interior space 20*b*. In this manner, second access panel 70 does not occupy any of the floor space within interior space 20*b*, and preferably does not significantly restrict movement of an animal within interior space 20*b*. As shown in FIGS. 16 and 17, second access panel 70 includes a base 106 that is generally triangular and that includes a front surface 106*a* shown in FIG. 16 and a rear surface 106*b* shown in FIG. 17. A plurality of triangular shaped vent openings 108 extend through base 106. Vent openings 108 are aligned with opening 62 through access panel mount 60 when second access panel 70 is coupled to access panel mount 60. Vent openings 108 are configured and positioned in a substantially similar pattern as the vent openings 78 of first access panel 16. Thus, vent openings 108 are not described in detail herein. A slot 110 through base 106 is positioned below vent openings 108 and extends along a radial arc with a center point at the middle of vent openings 108.

Referring to FIG. 17, second access panel 70 includes three magnets 112*a-c* mounted adjacent corners of rear surface 106*b*. Magnets 112*a-c* are preferably spaced apart and positioned so that they are operable to removably couple to magnets 62*a-c*, respectively, of access panel mount 60

Figure 8:
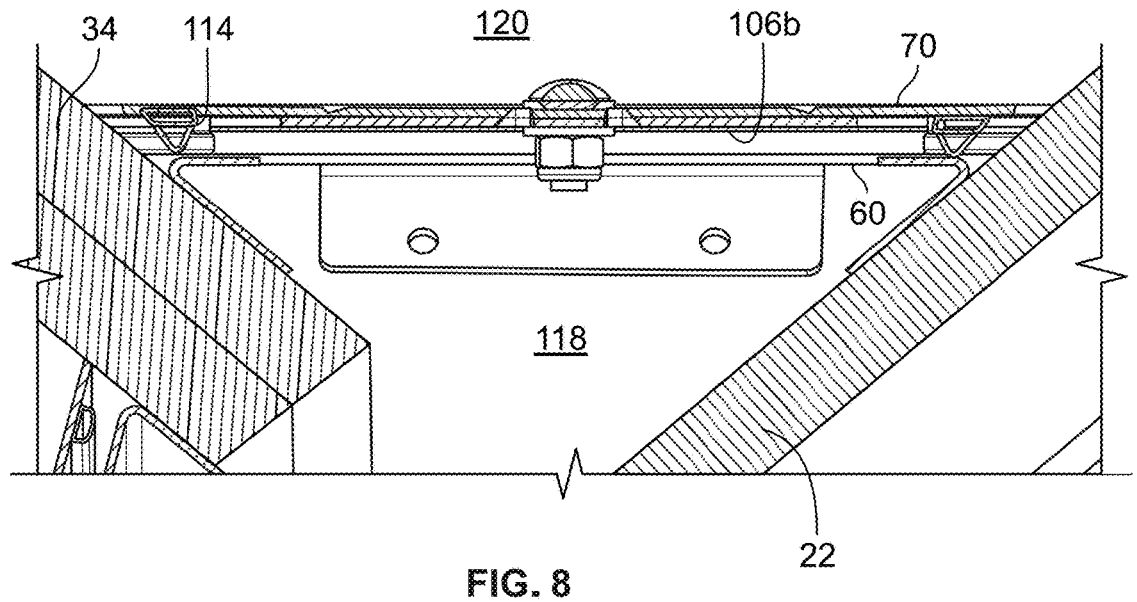
FIG. 8 is a cross-sectional view taken through the line 8-8 in FIG. 7.

(FIG. 16). Magnets 112a-c may be mounted to rear surface 106b with fasteners (e.g., screws or rivets) as shown or any other suitable means. A seal 114 is mounted to rear surface 106b and extends around a peripheral edge of rear surface 106b. Seal 114 may be formed from a plurality of sections each mounted along one side of rear surface 106b. Seal 114 is preferably a D-shaped seal, as shown in FIG. 8; however, other types of seals are within the scope of the present invention. When second access panel 70 is mounted to access panel mount 60, as shown in FIG. 8, seal 114 preferably sealingly engages access panel mount 60 to prevent any substantial amount of air flow between second access panel 70 and access panel mount 60.

Second access panel 70 includes a damper system 116 mounted to base 106 that is operable to selectively uncover and cover vent openings 108. Damper system 116 is mounted to base 106 in substantially the same manner as described above with respect to damper system 86 and base 75. Further, damper system 116 operates in substantially the same manner as damper system 86 described above. Accordingly, damper system 116 is not described in detail herein. Second access panel 70 may include another type of damper system that allows a user to selectively open and close vent openings in the access panel other than the damper system 116. For example, second access panel 70 may include a damper system that is configured as a sliding plate or as shutters. Further, in some embodiments, damper system 116 can be omitted entirely such that the vent openings 108 through second access panel 70 always permit air to flow through base 106.

When second access panel 70 is mounted to wall assembly 12, second access panel 70 divides interior space 20b into a vent space 118 and a living space 120, as shown in FIG. 8. The vent space 118 is the space positioned between the rear surface 106b of second access panel 70, rear wall 22, first divider 34, and upper wall 28. The living space 120 includes the remainder of interior space 20b not including the vent space 118. Vent space 118 is in fluid communication with interior opening 46 (FIG. 10), which places vent space 118 in fluid communication with the vent space 96 (FIG. 5) behind first access panel 16. Vent openings 108 and damper system 116 are configured to place the living space 120 in fluid communication with the vent space 118. Except for air passing through vent openings 108, vent space 118 is preferably substantially sealed from living space 120 to prevent the passage of air between vent space 118 and living space 120. The connection between access panel mount 60 and wall assembly 12, and the sealing engagement between second access panel 70 and access panel mount 60, preferably seals vent space 118 from living space 120.

Third and fourth access panels 72 and 74 (FIG. 2) are preferably structured in a substantially similar manner as second access panel 70. Accordingly, the structure of third and fourth access panels 72 and 74 is not described in detail herein. Third access panel 72 is removably mounted to an access panel mount (not shown) positioned in interior space 20e that is preferably substantially similar to access panel mount 60. Third access panel 72 has sides that abut or are positioned adjacent to rear wall 22, middle wall 30, and first divider 34 to form a vent space (not shown) that is positioned between a rear surface (not shown) of third access panel 72, rear wall 22, middle wall 30, and first divider 34. The vent space behind third access panel 72 is in fluid communication with interior opening 48 (FIG. 10) and interior opening 50 (FIG. 11). Interior opening 50 places the vent space behind third access panel 72 in fluid communication with the vent space 96 (FIG. 5) behind first access panel 16. The remainder of interior space 20e not including the vent space behind third access panel 72 constitutes a living space 122, as described above with respect to second access panel 70. The living space and vent space of interior space 20e are preferably substantially sealed from each other by third access panel 72 and the access panel mount (not shown) to which third access panel 72 mounts, such that air preferably must pass through the vent openings and damper system of third access panel 72 to pass from the living space to the vent space of interior space 20e.

Fourth access panel 74 is removably mounted to an access panel mount (not shown) positioned in interior space 20f that is preferably substantially similar to access panel mount 60. Fourth access panel 74 has sides that abut or are positioned adjacent to rear wall 22, middle wall 30, and first divider 34 to form a vent space (not shown) that is positioned between a rear surface (not shown) of fourth access panel 74, rear wall 22, middle wall 30, and first divider 34. The vent space behind fourth access panel 74 is in fluid communication with interior opening 48 (FIG. 10). Interior opening 48 places the vent space behind fourth access panel 74 in fluid communication with the vent space (not shown) behind third access panel 72 and the vent space 96 (FIG. 5) behind first access panel 16. The remainder of interior space 20f not including the vent space behind fourth access panel 74 constitutes a living space 124, as described above with respect to second access panel 70. The living space and vent space of interior space 20f are preferably substantially sealed from each other by fourth access panel 74 and the access panel mount (not shown) to which fourth access panel 74 mounts, such that air preferably must pass through the vent openings and damper system of fourth access panel 74 to pass from the living space to the vent space of interior space 20f.

Ventilation system 18 is operable to draw air from the vent space 96 behind first access panel 16, the vent space 118 behind second access panel 70, the vent space (not shown) behind third access panel 72, and the vent space (not shown) behind fourth access panel 74. Further, ventilation system 18 is operable to draw air from the living spaces 98 and 120 of interior spaces 20a and 20b, respectively, through vent openings 78 and 108, respectively, and damper systems 86 and 116, respectively. Ventilation system 18 is also operable to draw air from the living spaces 122 and 124 of interior spaces 20e and 20f, respectively, through the vent openings and damper systems of third and fourth access panels 72 and 74, respectively. Damper systems 86 and 116, and the damper systems of third and fourth access panels 72 and 74, may be adjusted to selectively cover and uncover the vent openings 78 and 108 and the vent openings (not shown) in third and fourth access panels 72 and 74 for the purpose of adjusting the air flow rate through each of the access panels 16, 70, 72, and 74. For example, in order to equalize the air flow rate through each of the access panels 16, 70, 72, and 74, damper system 86 may be set to cover a larger portion of the vent openings 78 in first access panel 16 than the portion of the vent openings covered by the damper systems of the second, third, and fourth access panels 70, 72, and 74. This is because vent openings 78 in first access panel 16 are closer to ventilation system 18 than the vent openings of the other access panels 70, 72, and 74. Likewise, damper system 116 may be set to cover more of the vent openings 108 in second access panel 70 than the damper systems of third and fourth access panels 72 and 74, and the damper system of the third access panel may be set to cover more of the vent openings in third access panel 72 than the damper system of fourth access panel 74. Further, if, for example, one of the living spaces 98, 120, 122, and 124 is not in use, the damper system of the access panel 16, 70, 72, or 74 within the associated interior space 20a, 20b, 20e or 20f may be set to completely cover the vent openings of the access panel 16, 70, 72 or 74 so that substantially no air is drawn from the living space 98, 120, 122, and 124 that is not being used. In this manner, the ventilation system 18 may only draw air from the living spaces 98, 120, 122, and 124 that are in use.

In use, animal enclosure 10 is preferably used to house a number of animals, such as cats. For example, interior spaces 20a and 20b may be used to house one or more cats, interior spaces 20c and 20d may be used to house one or more cats, interior spaces 20e and 20f may be used to house one or more cats, and interior spaces 20g and 20h may be used to house one or more cats. Fan 18e of ventilation system 18 may be powered on in order to induce air circulation by drawing air from the living spaces 98, 120, 122, and 124 of interior spaces 20a, 20b, 20e, and 20f, respectively, and the living spaces of interior spaces 20c, 20d, 20g, and 20h. The damper systems of access panels 16, 70, 72, and 74, and the damper systems of the access panels positioned within interior spaces 20c, 20d, 20g, and 20h, may be adjusted as described above to equalize the air flow rate of the air drawn from the living spaces 98, 120, 122, and 124 (and the living spaces of interior spaces 20c, 20d, 20g, and 20h) through the access panels by ventilation system 18. Alternatively, the damper systems may be adjusted to achieve any desirable air flow rate through the access panels. The ventilation system 18 preferably draws stale air, odors, and airborne pathogens from the animal enclosure 10, and otherwise enhances air flow in and through animal enclosure 10, to improve the living conditions of the animals within the animal enclosure 10 and the working conditions of the workers servicing the animals. By drawing air from animal enclosure 10, ventilation system 18 lowers the air pressure within interior spaces 20a-h causing air from outside animal enclosure 10 to enter animal enclosure 10 through doors 14 (if the doors 14 have openings as shown in FIG. 1) or other openings in animal enclosure 10. The access panels 16, 70, 72, and 74, and the access panels within interior spaces 20c, 20d, 20g, and 20h, may be removed from engagement with wall assembly 12 in order to access and clean the space behind the access panels.

While animal enclosure 10 is preferably configured as described above and shown in the drawings, animal enclosure 10 is only one embodiment of animal enclosure in accordance with the invention described and claimed herein. Animal enclosure 10 may be modified to have any number of interior spaces with a panel, such as access panel 16 or 70, positioned in at least one of the interior spaces to divide the interior space into a vent space and a living space. For example, an animal enclosure that only includes a single interior space is within the scope of the present invention. Such an animal enclosure may be configured to have just the portion of wall assembly 12 shown in FIG. 1 that is positioned around interior space 20a or 20b. If interior space 20a is the sole interior space, the wall assembly 12 surrounding interior space 20a may be modified so that opening 42 and interior openings 46 and 50 are blocked off. Further, access panel mount 54 and first access panel 16 may be replaced with an access panel mount and access panel that are similar to access panel mount 60 and second access panel 70 so that the second access panel 70 is spaced above the floor of the interior space 20a. If interior space 20b is the sole interior space, the wall assembly surrounding interior space 20b may be modified so that opening 42 and interior opening 46 are blocked off and so that an exterior opening and vent connector are added to upper wall 28 in fluid communication with the vent space 118. In either of these alternative embodiments, none of the floor space within interior spaces 20a and 20b would be occupied by the access panel leaving substantially all of the interior spaces 20a and 20b free to be occupied by an animal.

In another alternative embodiment of animal enclosure in accordance with the invention, animal enclosure 10 may be modified to have only two interior spaces positioned side-by-side. For example, animal enclosure 10 may be modified to have just the portions of wall assembly 12 forming interior spaces 20a and 20b. In such an embodiment, interior opening 50 may be blocked off. Access panel mount 54 and first access panel 16 may be replaced with an access panel mount and access panel that are similar to access panel mount 60 and second access panel 70 so that the second access panel 70 is spaced above the floor of the interior space 20a. Further, the second access panel 70 in interior space 20b may be removed and replaced with a vent or grill mounted to first divider 34 over interior opening 46. The vent or grill may include an adjustable damper system similar to damper system 86 for controlling the flow of air from interior space 20b to the ventilation system 18. Thus, none of the floor space within interior spaces 20a and 20b would be occupied by the access panels leaving substantially all of the interior spaces 20a and 20b free to be occupied by an animal.

It is also within the scope of the invention for animal enclosure 10 to be modified so that it has only two interior spaces, with one positioned on top of the other. For example, animal enclosure 10 may be modified to have just the portions of wall assembly 12 forming interior spaces 20a and 20e. In such an embodiment, openings 42 and 44 and interior openings 46 and 48 in first divider 34 are blocked. Further, the third access panel 72 in interior space 20e may be removed and replaced with a vent or grill mounted to middle wall 30 over interior opening 50. The vent or grill may include an adjustable damper system similar to damper system 86 for controlling the flow of air from interior space 20e to ventilation system 18. In another example, animal enclosure 10 may be modified to have just the portions of wall assembly 12 forming interior spaces 20b and 20f. In such an embodiment, openings 42 and 44 and interior openings 46 and 48 in first divider 34 are blocked. Exterior openings in fluid communication with the vent spaces behind second and fourth access panels 70 and 74 may be added to rear wall 22, and vent connectors may be mounted to the rear wall 22 to place the vent spaces in fluid communication with ventilation system 18. Alternatively, second access panel 70 and access panel mount 60 may be replaced with an access panel and access panel mount similar to first access panel 16 and access panel mount 54, and an interior opening may be added to middle wall 30 to place the vent space behind the access panel in interior space 20b in fluid communication with the vent space behind fourth access panel 74 in interior space 20f. An exterior opening then may be added to upper wall 28 or rear wall 22 that is in fluid communication with the vent space behind the access panel in interior space 20b, and a vent connector may be mounted to the upper wall 28 or rear wall 22 to place the vent spaces in fluid communication with ventilation system 18. Further, the fourth access panel 74 may be removed and replaced with a vent or grill mounted to middle wall 30 over the interior opening placing interior space 20f in fluid communication with interior space 20b. The vent or grill may include an adjustable damper system similar to damper system 86 for controlling the flow of air from interior space 20f to ventilation system 18.

It is further within the scope of the invention for animal enclosure 10 to have just four interior spaces. For example, animal enclosure 10 may comprise the four interior spaces 20a-b and 20e-f.

In another embodiment within the scope of the invention, animal enclosure 10 may be modified to have four exterior openings in upper wall 28 that are similar to exterior opening 52. For example, an exterior opening may be positioned above each of interior spaces 20a-d. In such an embodiment, the access panels in interior spaces 20b and 20d may be configured like first access panel 16 and interior openings may be formed in middle wall 30 to place the vent space behind the access panels in interior spaces 20b and 20d in fluid communication with the vent space behind the access panels in interior spaces 20f and 20h. The interior openings 46 and 48 in first divider 34 and interior openings in third divider 38 may be blocked. Further, in such an embodiment, the lower interior spaces 20e-h may be configured so that access panels like third and fourth access panels 72 and 74 are not positioned in the lower interior spaces 20e-h. For example, the access panels may be removed and vents or grills may be placed over the interior opening 50 leading from the interior space 20a to the interior space 20e and the other like interior openings in interior spaces 20f-h. The vents or grills may further include adjustable damper systems, like damper system 86.

Further, while access panels 16, 70, 72, and 74 are preferably removably coupled to wall assembly 12 with magnets as described above, it is within the scope of the invention for the access panels 16, 70, 72, and 74 to be removably coupled to wall assembly 12 in some other manner. For example, fasteners may be used to removably couple access panels 16, 70, 72, and 74 to wall assembly 12. In addition, access panels 16, 70, 72, and 74 may be removably coupled directly to the walls 22, 28, 30 and first divider 34 of wall assembly 12 instead of being removably coupled to access panel mounts 54 and 60. For example, magnets may be mounted to the walls 22, 28, 30 and first divider 34, and access panels 16, 70, 72, and 74 may be modified so that they are configured to mount directly to the walls 22, 28, and 30 and first divider 34. One or more of access panels 16, 70, 72, and 74 may further be modified so that they only mount directly to one of the walls 22, 28, and 30 or first divider 34. For example, first access panel 16 may be modified so that it only mounts to rear wall 22 or to first divider 34, or access panel mount 54 may be modified so that it only mounts to rear wall 22 or to first divider 34. Second and fourth access panels 70 and 74 may be modified so that they only mount to first divider 34, and third access panel 72 may be modified so that it only mounts to middle wall 30 and/or first divider 34. It is also within the scope of the invention for one or more of access panels 16, 70, 72, and 74 to be fixedly coupled or attached to wall assembly 12 such that the access panels 16, 70, 72, and 74 are not easily removable from engagement with wall assembly 12.

Figure 18:
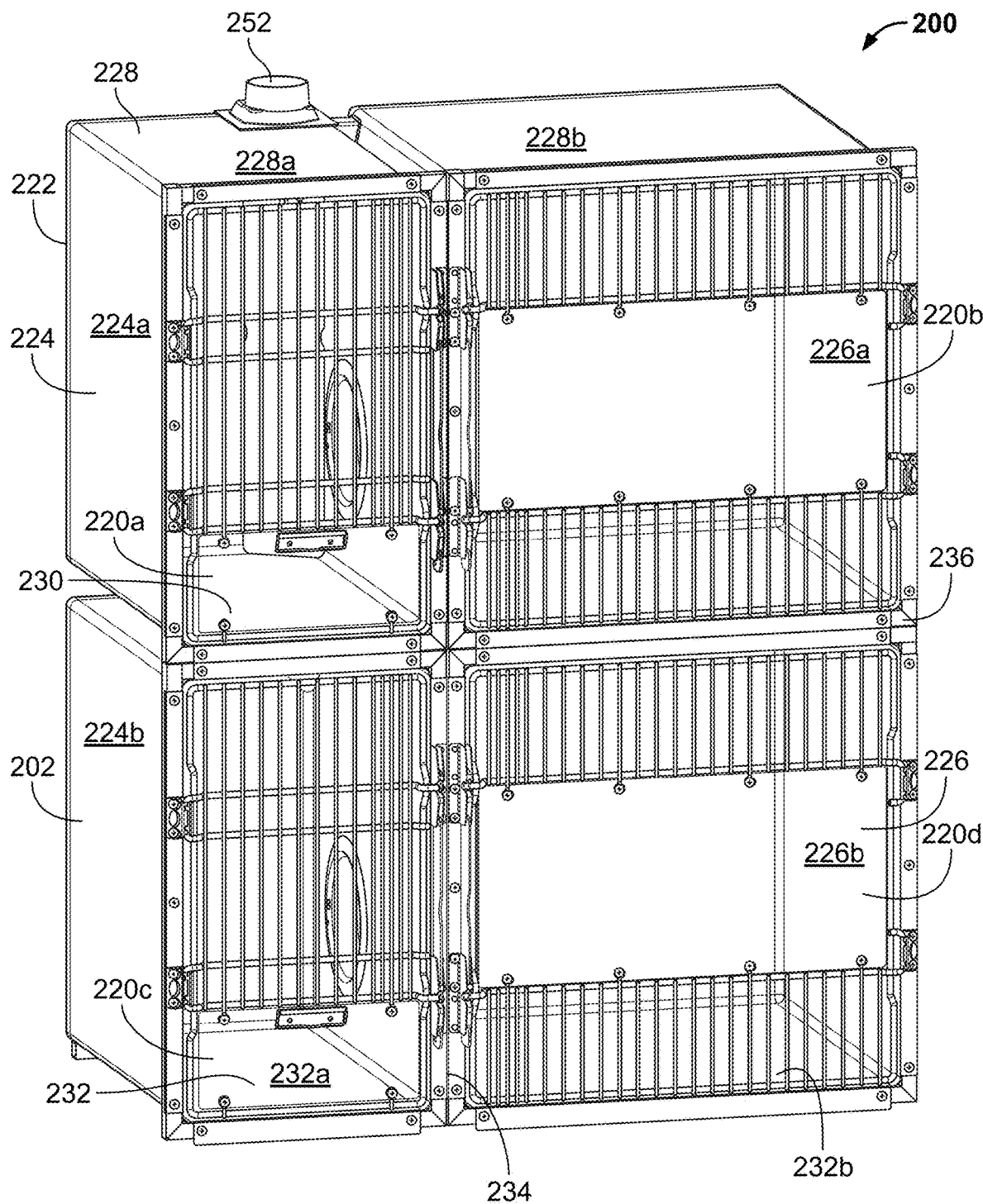
FIG. 18 is a perspective view of an alternative embodiment of animal enclosure configured for use with a ventilation system in accordance with the invention described herein.
Figure 19:
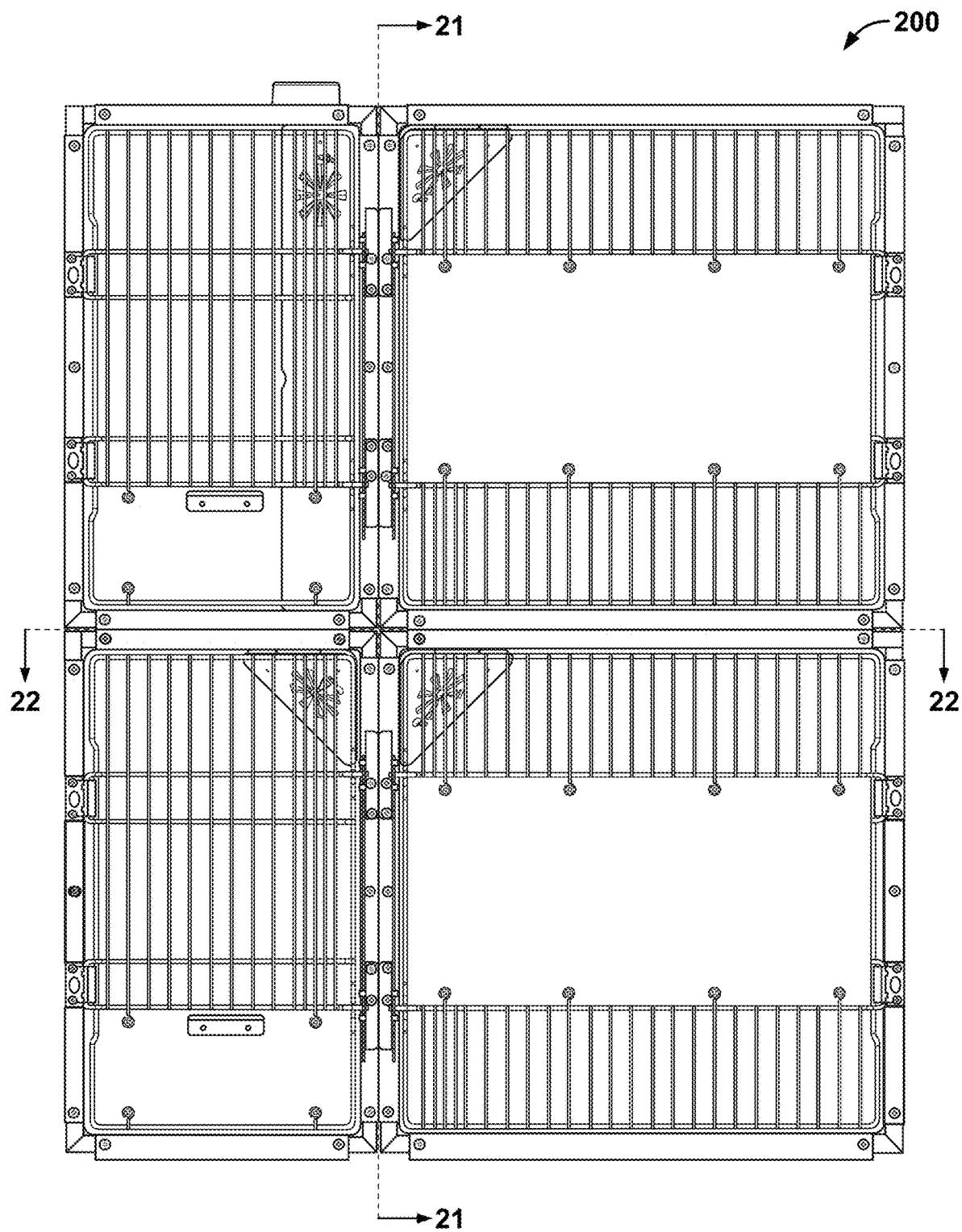
FIG. 19 is a front elevational view of the animal enclosure shown in FIG. 18.
Figure 20:
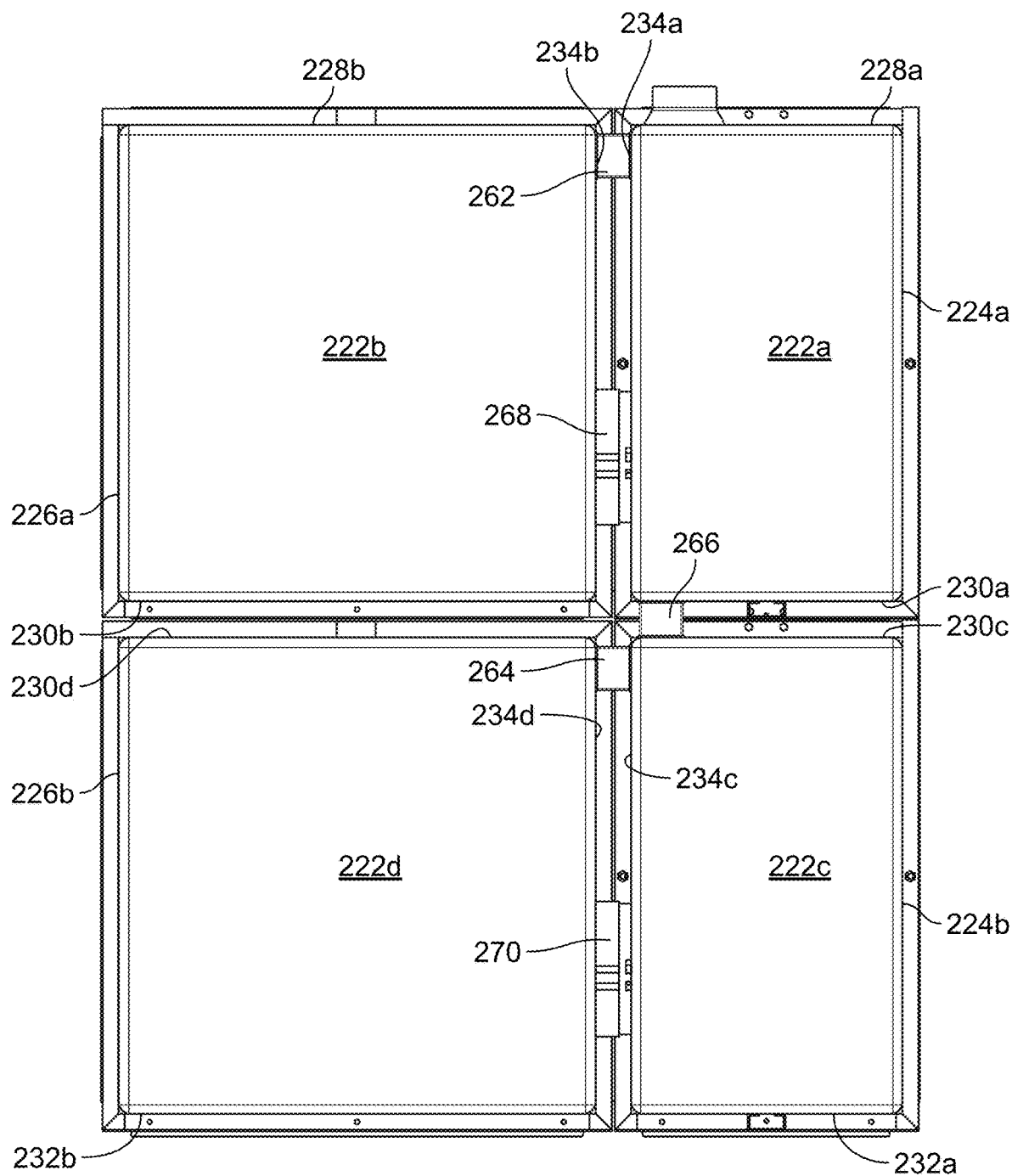
FIG. 20 is a rear elevational view of the animal enclosure shown in FIG. 18.

FIGS. 18-22 show another embodiment of animal enclosure 200 in accordance with the invention described herein. Animal enclosure 200 is substantially similar to the half of animal enclosure 10 defining interior spaces 20a, 20b, 20e, and 20f. Accordingly, only the material differences between animal enclosure 200 and animal enclosure 10 are described in detail herein. Animal enclosure 200 includes a wall assembly 202 with a plurality of walls that are joined together to define interior spaces 220a-d. Specifically, wall assembly 202 includes a rear wall 222, a first side wall 224, a second side wall 226, an upper wall 228, a middle wall 230, a lower wall 232, and a divider 234. As shown in FIG. 20, rear wall 222 includes four sections 222a-d that are spaced apart from each other. First side wall 224 includes two sections 224a-b that are spaced apart from each other. Second side wall 226 includes two sections 226a-b that are spaced apart from each other. Upper wall 228 includes two sections 228a-b that are spaced apart from each other. Middle wall 230 includes four sections 230a-d that are spaced apart from each other. Lower wall 232 includes two sections 232a-b that are spaced apart from each other. Divider 234 includes four sections 234a-d that are spaced apart from each other. The sections of rear wall 222, first side wall 224, second side wall 226, upper wall 228, middle wall 230, lower wall 232, and divider 234 are similar to the sections described above of the walls of animal enclosure 10 except that there is spacing between the wall sections of animal enclosure 200. As shown in FIG. 18, a front surface 236 of wall assembly 202 is formed by flanges extending generally perpendicularly outward from first side wall 224, second side wall 226, upper wall 228, middle wall 230, lower wall 232, and divider 234. The front surface 236 formed by these flanges maintains the spacing between the sections of wall assembly 202.

Rear wall section 222a, first side wall section 224a, upper wall section 228a, middle wall section 230a, and first divider section 234a form a first interior space 220a. Rear wall section 222b, upper wall section 228b, middle wall section 230b, first divider section 234b, and second side wall section 226a form a second interior space 220b. Rear wall section 222c, first side wall section 224b, middle wall section 230c, lower wall section 232a, and first divider section 234c form a third interior space 220c. Rear wall section 222d, middle wall section 230d, lower wall section 232b, first divider section 234d, and second side wall section 226b form a fourth interior space 220d.

Figure 21:
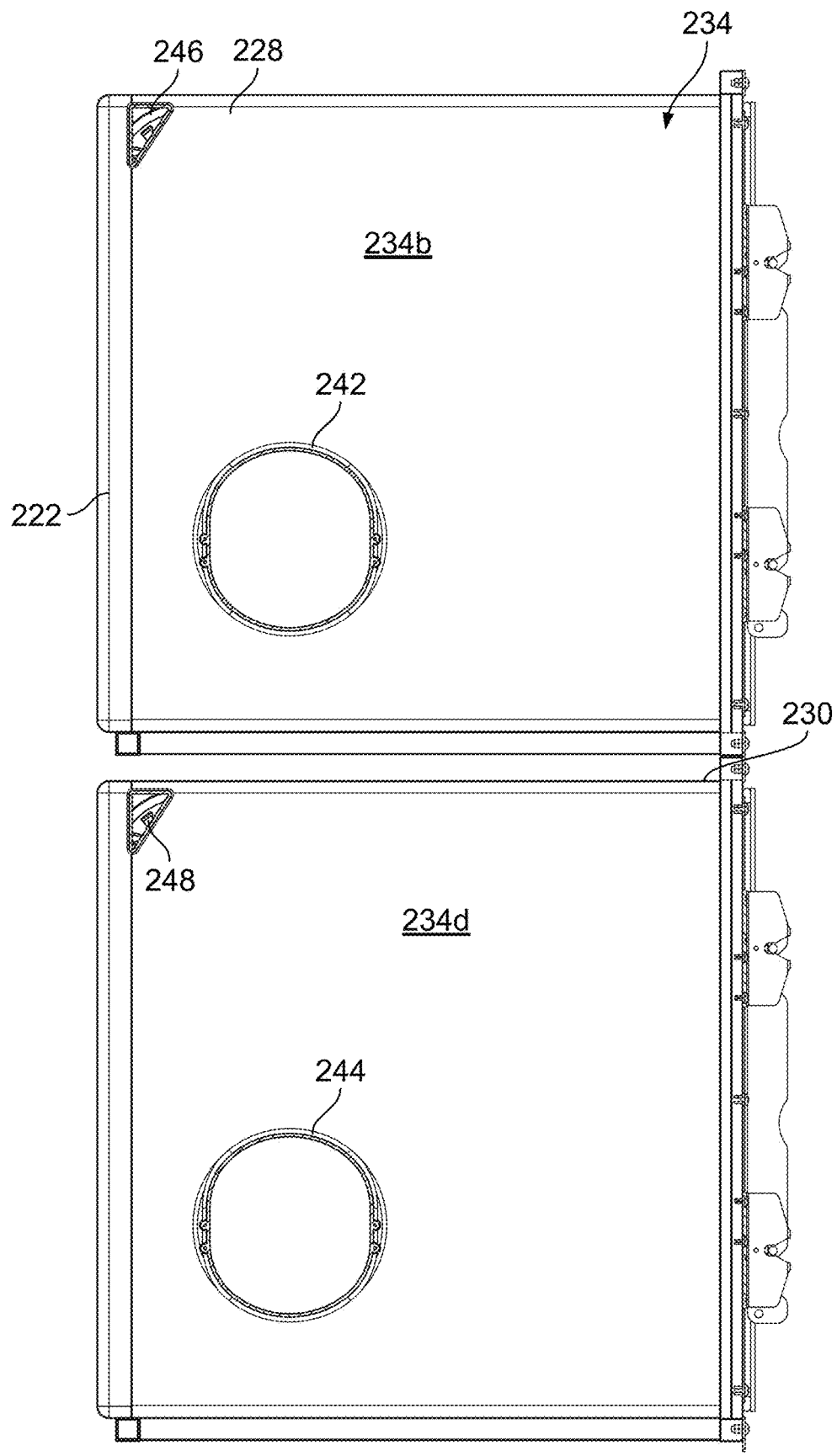
FIG. 21 is a cross-sectional view taken through the line 21-21 of FIG. 19.
Figure 22:
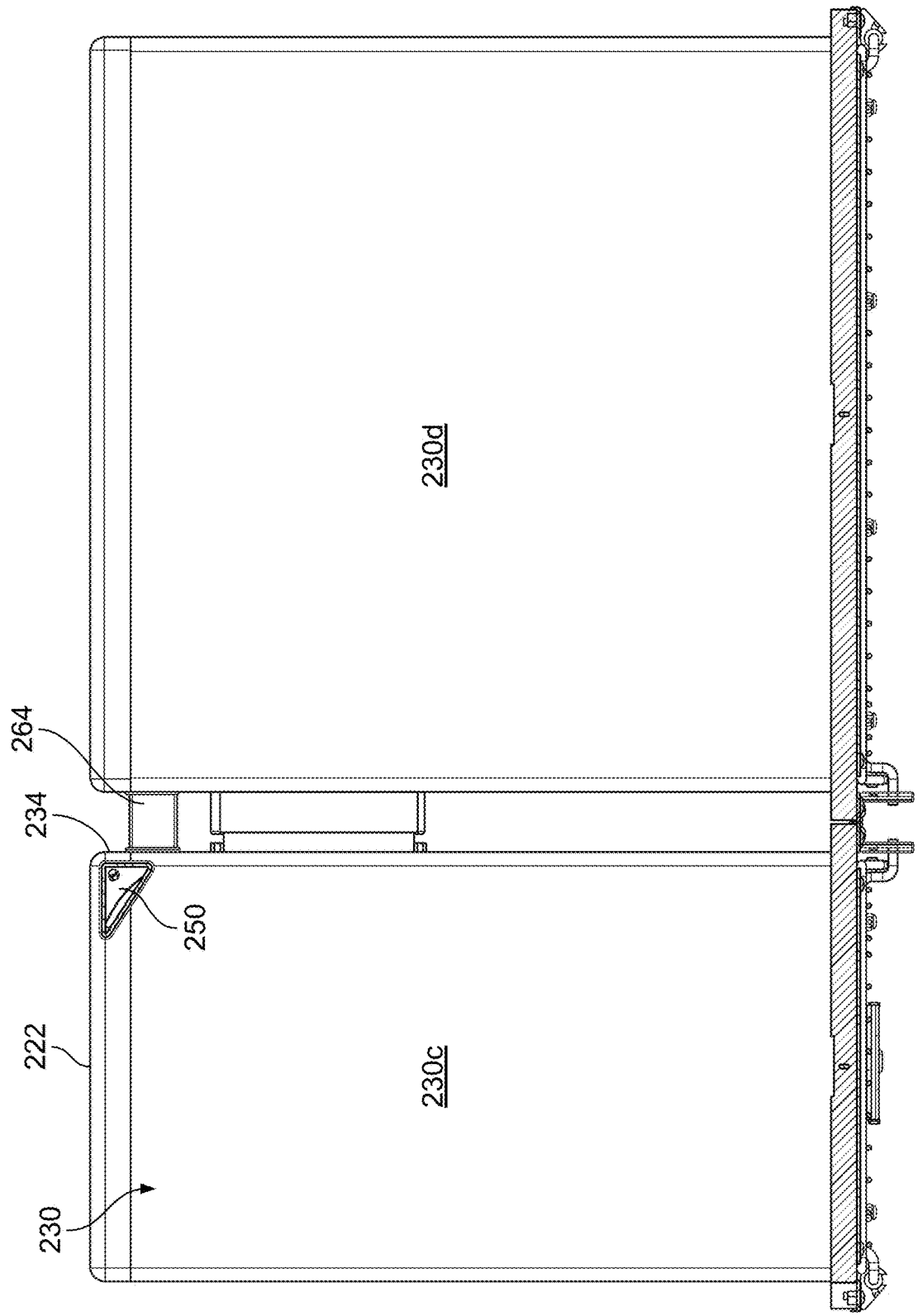
FIG. 22 is a cross-sectional view taken through the line 22-22 of FIG. 19.

Referring to FIG. 21, divider 234 includes an interior opening 246 that places interior space 220a in fluid communication with interior space 220b, and an interior opening 248 that places interior space 220c in fluid communication with interior space 220d. Interior opening 246 is positioned in an upper corner of divider 234 adjacent rear wall 222 and upper wall 228. Interior opening 246 extends through both of first divider sections 234a and 234b and through a conduit 262 (FIG. 20), which extends between first divider sections 234a-b. Interior opening 248 is positioned in a corner of interior space 220c adjacent rear wall 222 and below middle wall 230. Interior opening 248 extends through both of divider sections 234c and 234d and through a conduit 264 (FIG. 20), which extends between divider sections 234c-d. Referring to FIG. 22, middle wall 230 includes an interior opening 250 that places interior space 220a in fluid communication with interior space 220c. Interior opening 250 is positioned in a corner of interior space 220a adjacent rear wall 222 and divider 234. Interior opening 250 extends through both of middle wall sections 230a and 230c and through a conduit 266 (FIG. 20), which extends between middle wall sections 230a and 230c. Interior openings 246, 248, and 250 and conduits 262, 264, and 266 allow a ventilation system (e.g., the ventilation system 18 shown in FIG. 1) to draw air from interior spaces 20a-d through a single exterior opening 252 (FIG. 18) in upper wall 228 in a similar manner as described above for animal enclosure 10.

As shown in FIG. 21, there are also openings 242 and 244 in divider 234. Opening 242 connects interior space 220a to interior space 220b, and opening 244 connects interior space 220c to interior space 220d. Opening 242 extends through the sections 234a-b of divider 234 and through a conduit 268, which extends between divider sections 234*a-b*. Opening 244 extends through the sections 234*c-d* of divider 234 and through a conduit 270, which extends between divider sections 234*c-d*. Openings 242, 244 and conduits 268, 270 are preferably sized so that a small companion animal (e.g., a cat) can pass through them and are preferably configurable in a similar manner as described above with respect to the openings 42, 44 of animal enclosure 10.

Other than the material differences described above between animal enclosure 200 and animal enclosure 10, animal enclosure 200 is structured and operates in substantially the same manner as animal enclosure 10 described above. Animal enclosure 200 may further be modified in any of the manners described above with respect to animal enclosure 10.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An animal enclosure comprising:
    a wall assembly comprising a plurality of walls coupled together to define an interior space, wherein the wall assembly defines an exterior opening configured for fluid connection to a ventilation system, wherein the wall assembly further defines a second interior space positioned adjacent the interior space, wherein an interior opening extends through the wall assembly from the interior space to the second interior space;
    an access panel configured to removably couple to the wall assembly, wherein at least one vent opening is formed in the access panel, wherein when the access panel is coupled to the wall assembly, the access panel divides the interior space into a vent space and a living space, wherein the vent space is in fluid communication with the exterior opening, and wherein the vent opening is configured to place the living space in fluid communication with the vent space, and wherein the interior opening is in fluid communication with the vent space; and
    a vent connector that is mounted to the wall assembly, wherein the vent connector covers the exterior opening, and wherein the vent connector is configured to couple to the ventilation system,
    wherein the plurality of walls comprises a rear wall, a first side wall, a second side wall, a ceiling, and a floor, wherein the access panel is configured to removably couple to the wall assembly such that the access panel is spaced above the floor,
    wherein the access panel is configured to removably couple to the wall assembly so that the access panel extends between the rear wall, the ceiling, and at least one of the first side wall and the second side wall.

2. An animal enclosure comprising:
    a wall assembly comprising a plurality of walls coupled together to define an interior space, wherein the wall assembly defines an exterior opening configured for fluid connection to a ventilation system, wherein the wall assembly further defines a second interior space positioned adjacent the interior space, wherein an interior opening extends through the wall assembly from the interior space to the second interior space;
    an access panel configured to removably couple to the wall assembly, wherein at least one vent opening is formed in the access panel, wherein when the access panel is coupled to the wall assembly, the access panel divides the interior space into a vent space and a living space, wherein the vent space is in fluid communication with the exterior opening, and wherein the vent opening is configured to place the living space in fluid communication with the vent space, and wherein the interior opening is in fluid communication with the vent space;
    a vent connector that is mounted to the wall assembly, wherein the vent connector covers the exterior opening, and wherein the vent connector is configured to couple to the ventilation system and
    a conduit extending between the interior space and the second interior space, wherein the conduit places the interior space in fluid communication with the second interior space, wherein the plurality of walls includes a ceiling and a floor, wherein the conduit is closer to the ceiling than the floor or extends from the ceiling to the floor,
    wherein the access panel comprises a damper system that is operable to selectively uncover and cover the vent opening in a continuous range between an entirely open position and an entirely closed position.

3. The animal enclosure of claim 2, further comprising a seal that is positioned between the access panel and the wall assembly when the access panel is coupled to the wall assembly.

4. The animal enclosure of claim 3, wherein the seal is coupled to the access panel.

5. The animal enclosure of claim 2, wherein the access panel or the wall assembly comprises a magnet that is configured to removably couple the access panel to the wall assembly.

6. The animal enclosure of claim 2, further comprising a door that is coupled to the wall assembly.

7. The animal enclosure of claim 2, further comprising a second access panel that is configured to removably couple to the wall assembly within the second interior space, wherein at least one second vent opening is formed in the second access panel, wherein when the second access panel is coupled to the wall assembly, the second access panel divides the second interior space into a second vent space and a second living space, wherein the second vent space is in fluid communication with the interior opening, and wherein the second vent opening is configured to place the second living space in fluid communication with the second vent space.

8. The animal enclosure of claim 7, wherein the second access panel comprises a second damper system that is operable to selectively uncover and cover the second vent opening in a continuous range between a second entirely open position and a second entirely closed position.

9. The animal enclosure of claim 7, wherein the plurality of walls comprises a rear wall, a first side wall, a second side wall, an upper wall, a middle wall, and a lower wall, wherein the interior space is defined by the rear wall, the first side wall, the second side wall, the upper wall, and the middle wall, wherein the second interior space is positioned below the interior space, wherein the second interior space is defined by the rear wall, the first side wall, the second side wall, the middle wall, and the lower wall, and wherein the interior opening extends through the middle wall.

10. The animal enclosure of claim 9, wherein the access panel is configured to removably couple to the wall assembly so that the access panel extends between the rear wall and at least one of the first side wall and the second side wall, wherein the second access panel is configured to removably couple to the wall assembly so that the second access panel extends between the rear wall, the middle wall, and at least one of the first side wall and the second side wall such that the second access panel is spaced above the lower wall.

11. The animal enclosure of claim 9, wherein each of the rear wall, the first side wall, the second side wall, and the middle wall comprises a first section positioned adjacent the interior space and a second section positioned adjacent the second interior space.

12. The animal enclosure of claim 7, wherein the plurality of walls comprises a rear wall, a first side wall, a second side wall, a ceiling, a floor, and a divider, wherein the interior space is defined by the rear wall, the first side wall, the divider, the ceiling, and the floor, wherein the second interior space is defined by the rear wall, the divider, the second side wall, the ceiling, and the floor, and wherein the interior opening extends through the divider.

13. The animal enclosure of claim 12, wherein each of the access panel and the second access panel is configured to removably couple to the wall assembly so that the access panel and the second access panel extend between the rear wall, the ceiling, and the divider, and wherein each of the access panel and the second access panel is spaced above the floor.

14. The animal enclosure of claim 12, wherein each of the rear wall, the ceiling, the floor, and the divider comprises a first section positioned adjacent the interior space and a second section positioned adjacent the second interior space.

15. The animal enclosure of claim 14, the conduit extending between the first and second sections of the divider, wherein the conduit places the interior space in fluid communication with the second interior space.

16. The animal enclosure of claim 2, wherein the access panel is configured so that the vent opening can be selectively opened and closed.

17. An animal enclosure comprising:
a wall assembly comprising a plurality of walls coupled together to define a first interior space and a second interior space, wherein the wall assembly defines an opening configured for fluid connection to a ventilation system, and wherein an interior opening extends through the wall assembly from the first interior space to the second interior space;
a first panel coupled to the wall assembly, wherein at least one first vent opening is formed in the first panel, wherein the first panel divides the first interior space into a first vent space and a first living space, wherein the first vent space is in fluid communication with the opening, and wherein the first vent opening is configured to place the first living space in fluid communication with the first vent space; and
a second panel coupled to the wall assembly, wherein at least one second vent opening is formed in the second panel, wherein the second panel divides the second interior space into a second vent space and a second living space, wherein the second vent space is in fluid communication with the interior opening, and wherein the second vent opening is configured to place the second living space in fluid communication with the second vent space,
wherein the first panel comprises a first damper system that is operable to selectively uncover and cover the first vent opening in a continuous range between an entirely open position and an entirely closed position,
wherein the second vent space is downstream from the first vent space such that the animal enclosure is configuration to flow air from the ventilation system, through the first vent space, and into the second vent space.

18. The animal enclosure of claim 17, wherein the plurality of walls comprises a rear wall, a first side wall, a second side wall, an upper wall, a middle wall, and a lower wall, wherein the first interior space is defined by the rear wall, the first side wall, the second side wall, the upper wall, and the middle wall, wherein the second interior space is positioned below the first interior space, wherein the second interior space is defined by the rear wall, the first side wall, the second side wall, the middle wall, and the lower wall, and wherein the interior opening extends through the middle wall.

19. The animal enclosure of claim 18, wherein the first panel is coupled to the wall assembly so that the first panel extends between the rear wall and at least one of the first side wall and the second side wall, wherein the second panel is coupled to the wall assembly so that the second panel extends between the rear wall, the middle wall, and at least one of the first side wall and the second side wall such that the second panel is spaced above the lower wall.

20. The animal enclosure of claim 18, wherein each of the rear wall, the first side wall, the second side wall, and the middle wall comprises a first section positioned adjacent the first interior space and a second section positioned adjacent the second interior space.

21. The animal enclosure of claim 20, further comprising a conduit extending between the first and second sections of the middle wall, wherein the conduit places the first interior space in fluid communication with the second interior space.

22. The animal enclosure of claim 17, wherein the plurality of walls comprises a rear wall, a first side wall, a second side wall, a ceiling, a floor, and a divider, wherein the first interior space is defined by the rear wall, the first side wall, the divider, the ceiling, and the floor, wherein the second interior space is defined by the rear wall, the divider, the second side wall, the ceiling, and the floor, and wherein the interior opening extends through the divider.

23. The animal enclosure of claim 22, wherein each of the first panel and the second panel is coupled to the wall assembly so that the first panel and the second panel extend between the rear wall, the ceiling, and the divider, and wherein each of the first panel and the second panel is spaced above the floor.

24. The animal enclosure of claim 22, wherein each of the rear wall, the ceiling, the floor, and the divider comprises a first section positioned adjacent the first interior space and a second section positioned adjacent the second interior space.

25. The animal enclosure of claim 24, further comprising a conduit extending between the first and second sections of the divider, wherein the conduit places the first interior space in fluid communication with the second interior space.

26. The animal enclosure of claim 17, wherein the second panel comprises a second damper system that is operable to selectively uncover and cover the second vent opening in a continuous range between a second entirely open position and a second entirely closed position.

27. The animal enclosure of claim 17, wherein the first panel is removably coupled to the wall assembly, and wherein the second panel is removably coupled to the wall assembly.

28. The animal enclosure of claim 17, further comprising a first seal that is positioned between the first panel and the wall assembly, and a second seal that is positioned between the second panel and the wall assembly.

29. An animal enclosure comprising:
a wall assembly comprising a plurality of walls coupled together to define a first interior space and a second interior space, wherein the wall assembly defines a first opening configured for fluid connection to a ventilation system, and wherein the wall assembly defines a second opening configured for fluid connection to the ventilation system;
a first panel coupled to the wall assembly, wherein at least one first vent opening is formed in the first panel, wherein the first panel divides the first interior space into a first vent space and a first living space, wherein the first vent space is in fluid communication with the first opening, and wherein the first vent opening is configured to place the first living space in fluid communication with the first vent space;
a second panel coupled to the wall assembly, wherein at least one second vent opening is formed in the second panel, wherein the second panel divides the second interior space into a second vent space and a second living space, wherein the second vent space is in fluid communication with the second opening, and wherein the second vent opening is configured to place the second living space in fluid communication with the second vent space, and
a channel positioned between the first vent space and the second vent space and configured to allow for air to flow downstream from the first vent space to the second vent space,
wherein the first panel comprises a first damper system that is operable to selectively uncover and cover the first vent opening in a continuous range between an entirely open position and an entirely closed position, and wherein the second panel comprises a second damper system that is operable to selectively uncover and cover the second vent opening in a continuous range between a second entirely open position and a second entirely closed position.

30. The animal enclosure of claim 29, wherein the wall assembly further defines a third interior space and a fourth interior space, wherein the first interior space is positioned above the third interior space, and wherein the second interior space is positioned above the fourth interior space.

31. The animal enclosure of claim 30, wherein a first interior opening extends through the wall assembly from the first interior space to the third interior space, and wherein a second interior opening extends through the wall assembly from the second interior space to the fourth interior space.

32. The animal enclosure of claim 31, further comprising:
a third panel coupled to the wall assembly, wherein at least one third vent opening is formed in the third panel, wherein the third panel divides the third interior space into a third vent space and a third living space, wherein the third vent space is in fluid communication with the first interior opening, and wherein the third vent opening is configured to place the third living space in fluid communication with the third vent space; and
a fourth panel coupled to the wall assembly, wherein at least one fourth vent opening is formed in the fourth panel, wherein the fourth panel divides the fourth interior space into a fourth vent space and a fourth living space, wherein the fourth vent space is in fluid communication with the second interior opening, and wherein the fourth vent opening is configured to place the fourth living space in fluid communication with the fourth vent space.

33. The animal enclosure of claim 32, wherein the wall assembly further defines a fifth interior space positioned adjacent the first interior space, a sixth interior spaced positioned below the fifth interior space, a seventh interior space positioned adjacent the second interior space, and an eighth interior space positioned below the seventh interior space.

34. The animal enclosure of claim 29, wherein the first panel is removably coupled to the wall assembly, and wherein the second panel is removably coupled to the wall assembly.

35. An animal enclosure comprising:
a wall assembly comprising a rear wall, a first side wall extending outward from the rear wall, a second side wall extending outward from the rear wall and spaced apart from the first side wall, a ceiling extending outward from the rear wall and between the first and second side walls, and a floor extending outward from the rear wall and spaced apart from the ceiling, wherein the rear wall, the first side wall, the second side wall, the ceiling, and the floor define an interior space accessible through a main opening opposite the rear wall, wherein at least one of the rear wall, the first side wall, the second side wall, the ceiling, or the floor walls defines an exterior opening configured for fluid connection to a ventilation system;
a door coupled to the wall assembly and selectively movable to provide access to the interior space through the main opening; and
an access panel configured to removably couple to the wall assembly so that the access panel extends between the rear wall, the ceiling, and one of the first side wall or the second side wall to cover a portion of a corner defined by an intersection of the rear wall, the ceiling, and the one of the first side wall or the second side wall, wherein at least one vent opening is formed in the access panel, wherein when the access panel is coupled to the wall assembly, the access panel divides the interior space into a vent space and a living space, wherein the vent space is in fluid communication with the exterior opening defined by at least one of the rear wall, the first side wall, the second side wall, the ceiling, or the floor walls, and wherein the vent opening is configured to place the living space in fluid communication with the vent space.

36. The animal enclosure of claim 35, wherein the access panel is configured to removably couple to the wall assembly such that the access panel is spaced above the floor.

* * * * *